(12) United States Patent
Miyazawa

(10) Patent No.: US 8,477,428 B2
(45) Date of Patent: Jul. 2, 2013

(54) ZOOM LENS AND IMAGE PICKUP APPARATUS HAVING THE ZOOM LENS

(75) Inventor: Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 13/099,556

(22) Filed: May 3, 2011

(65) Prior Publication Data

US 2011/0286103 A1 Nov. 24, 2011

(30) Foreign Application Priority Data

May 24, 2010 (JP) ................................. 2010-117965

(51) Int. Cl.
*G02B 15/14* (2006.01)
(52) U.S. Cl.
USPC .......................................... 359/683; 359/676
(58) Field of Classification Search
USPC ................................................. 359/676, 683
See application file for complete search history.

(56) References Cited

U.S. PATENT DOCUMENTS

| 4,730,908 | A | 3/1988 | Tanaka |
| 7,623,298 | B2 | 11/2009 | Sudoh |
| 2009/0002842 | A1* | 1/2009 | Souma ........................ 359/684 |
| 2009/0067060 | A1* | 3/2009 | Sudoh ........................ 359/683 |
| 2010/0053765 | A1 | 3/2010 | Eguchi |

FOREIGN PATENT DOCUMENTS

| CN | 101008701 A | 8/2007 |
| CN | 101017237 A | 8/2007 |

* cited by examiner

*Primary Examiner* — William Choi
(74) *Attorney, Agent, or Firm* — Canon U.S.A., Inc. IP Division

(57) ABSTRACT

A zoom lens includes, in order from an object side to an image side, a first lens unit having a negative refractive power, a second lens unit having a positive refractive power, a third lens unit having a negative refractive power, a fourth lens unit having a positive or negative refractive power, and a fifth lens unit having a positive refractive power. In the zoom lens, the first lens unit is stationary during zooming. At least the second lens unit, the third lens unit, and the fifth lens unit move along an optical axis during zooming. Furthermore, in the zoom lens, a focal length of the entire zoom lens at a wide-angle end (fw) and an amount of movement of the second lens unit during zooming from the wide-angle end to a telephoto end (m2z) are appropriately set.

9 Claims, 17 Drawing Sheets

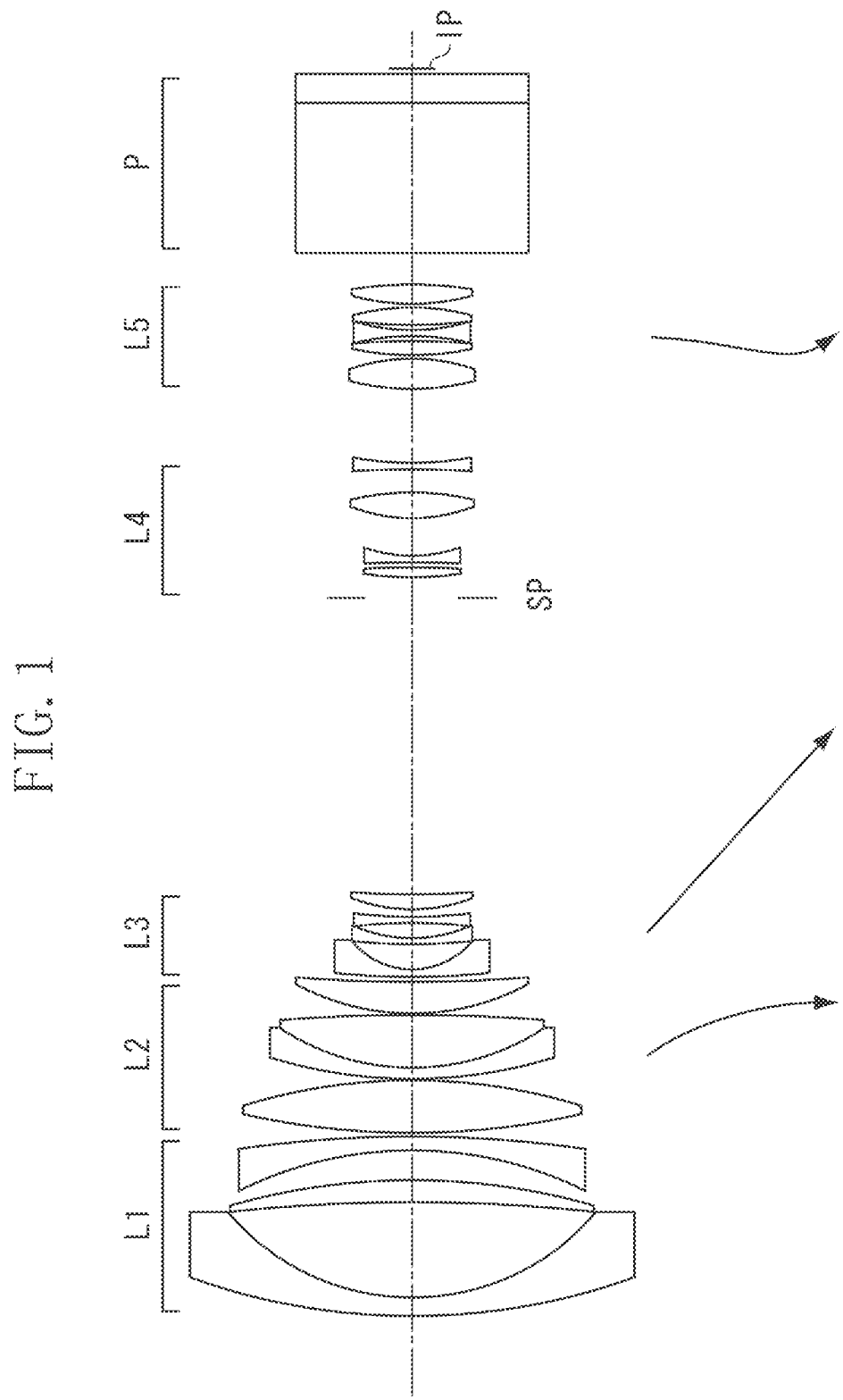

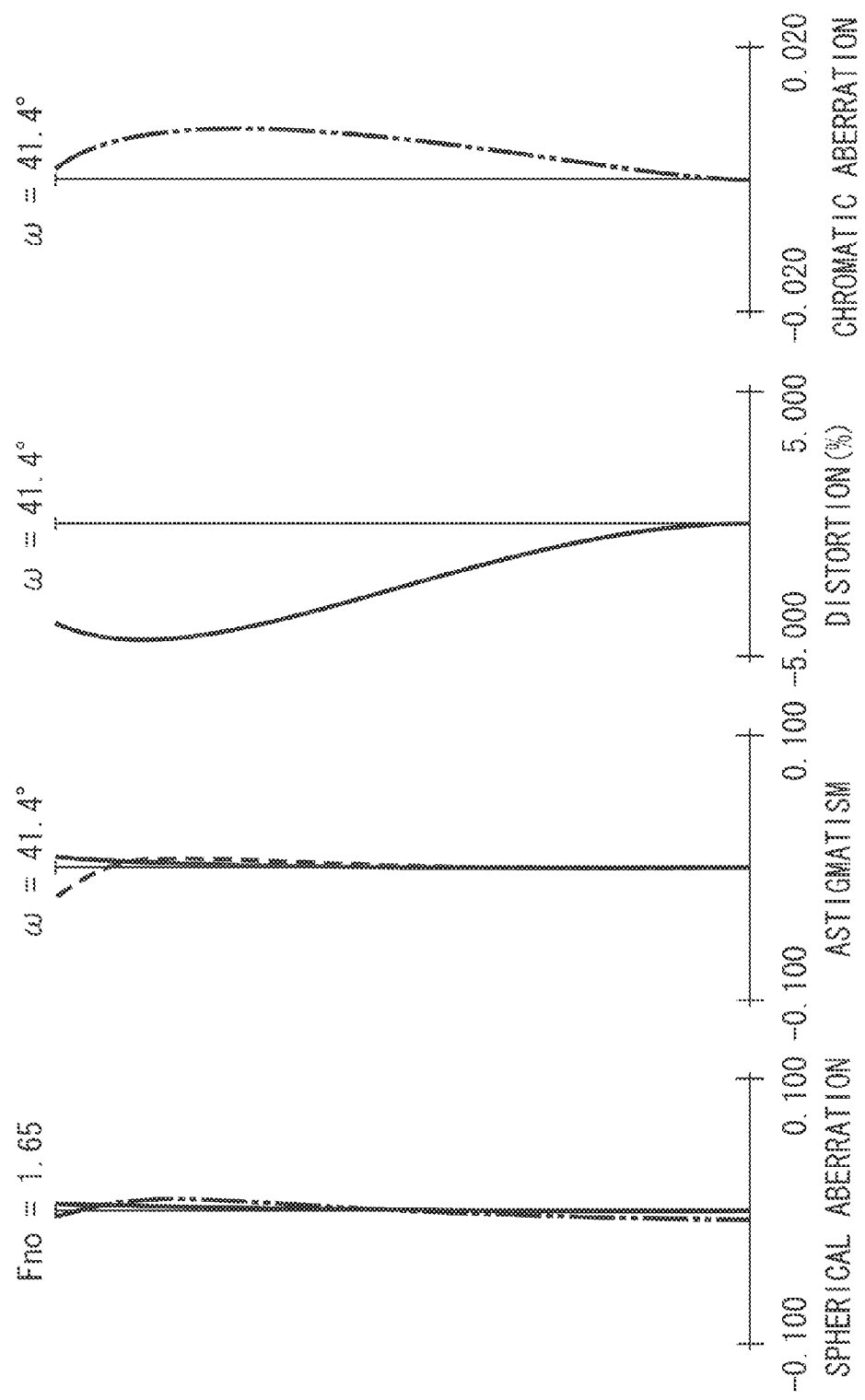

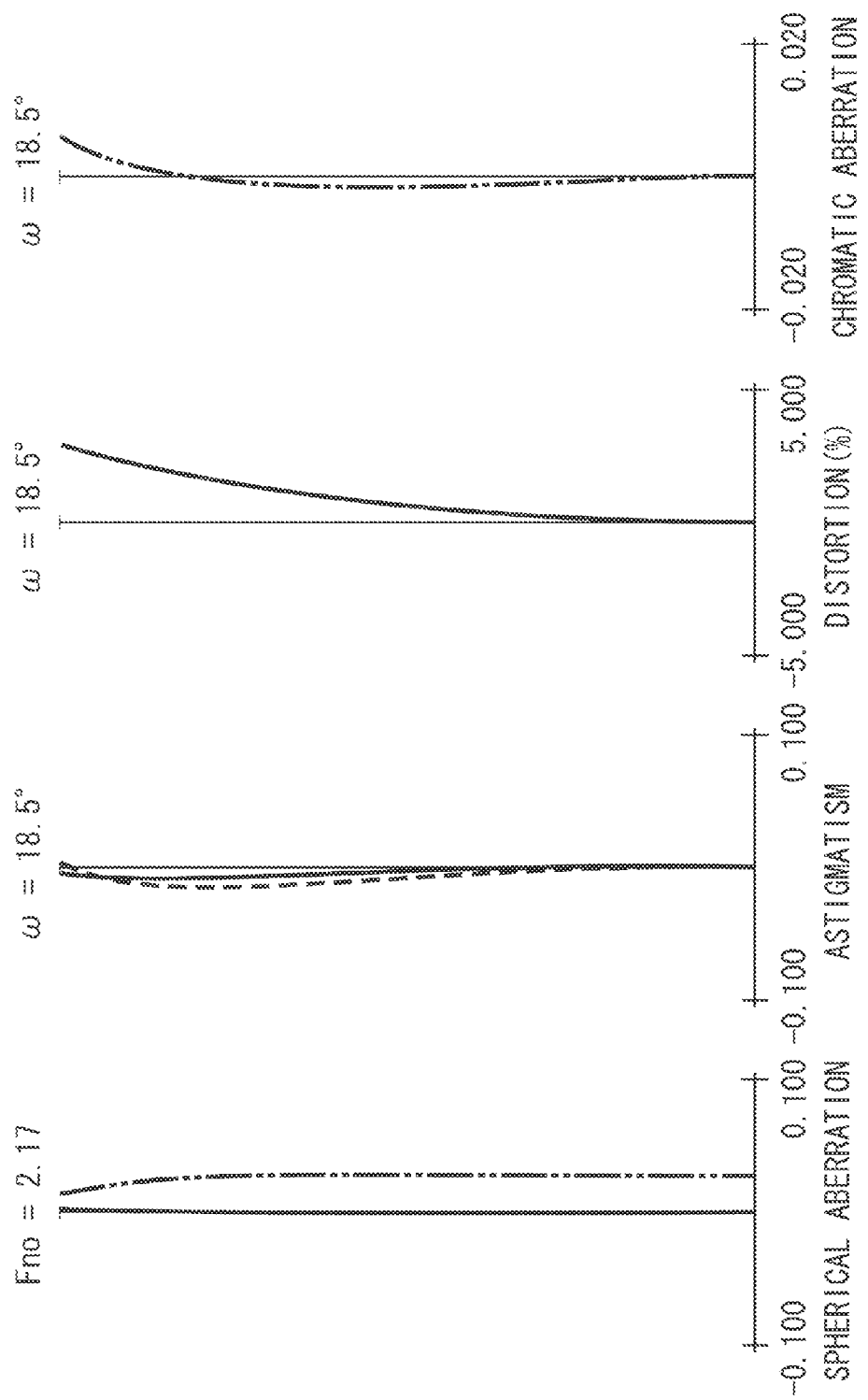

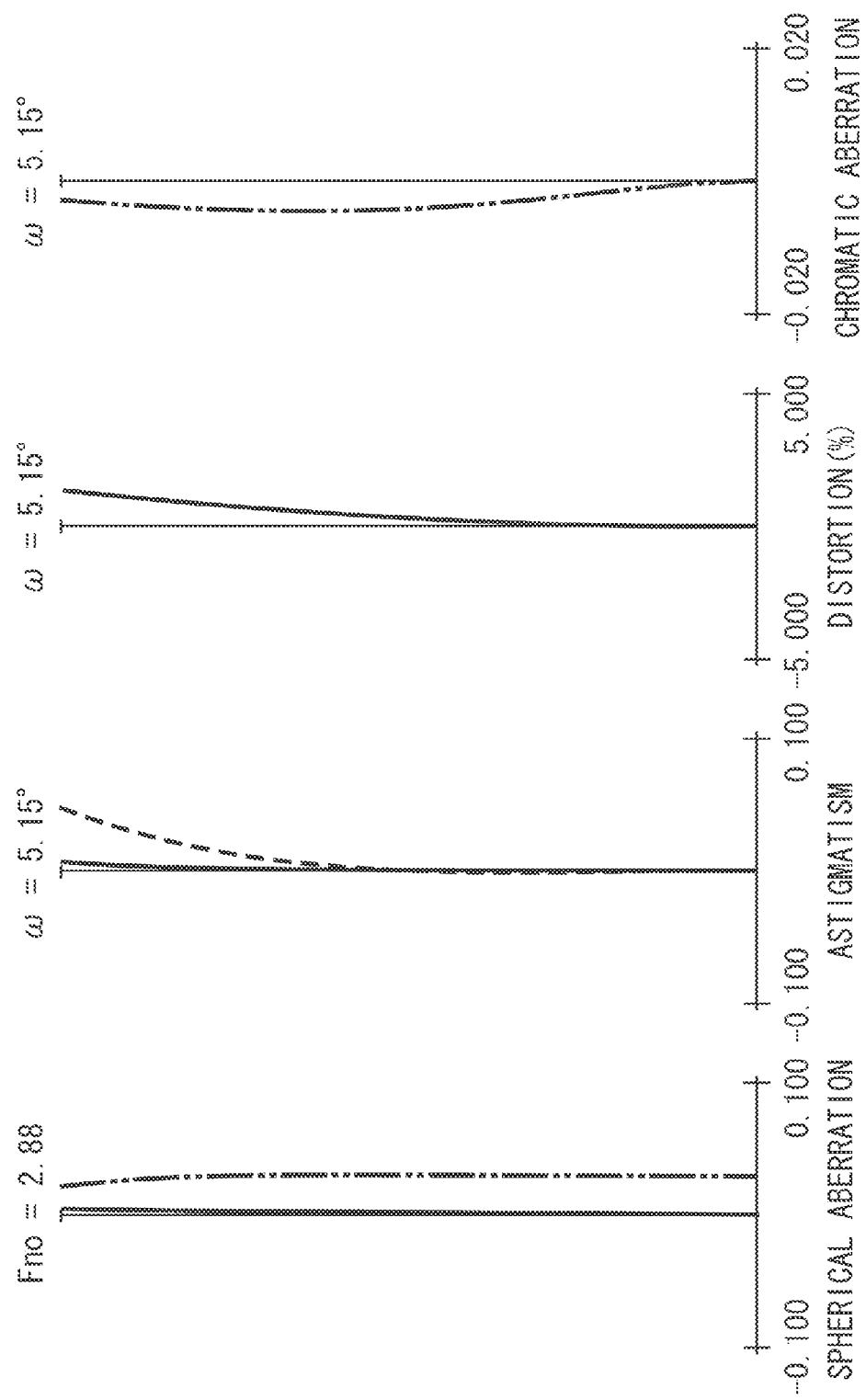

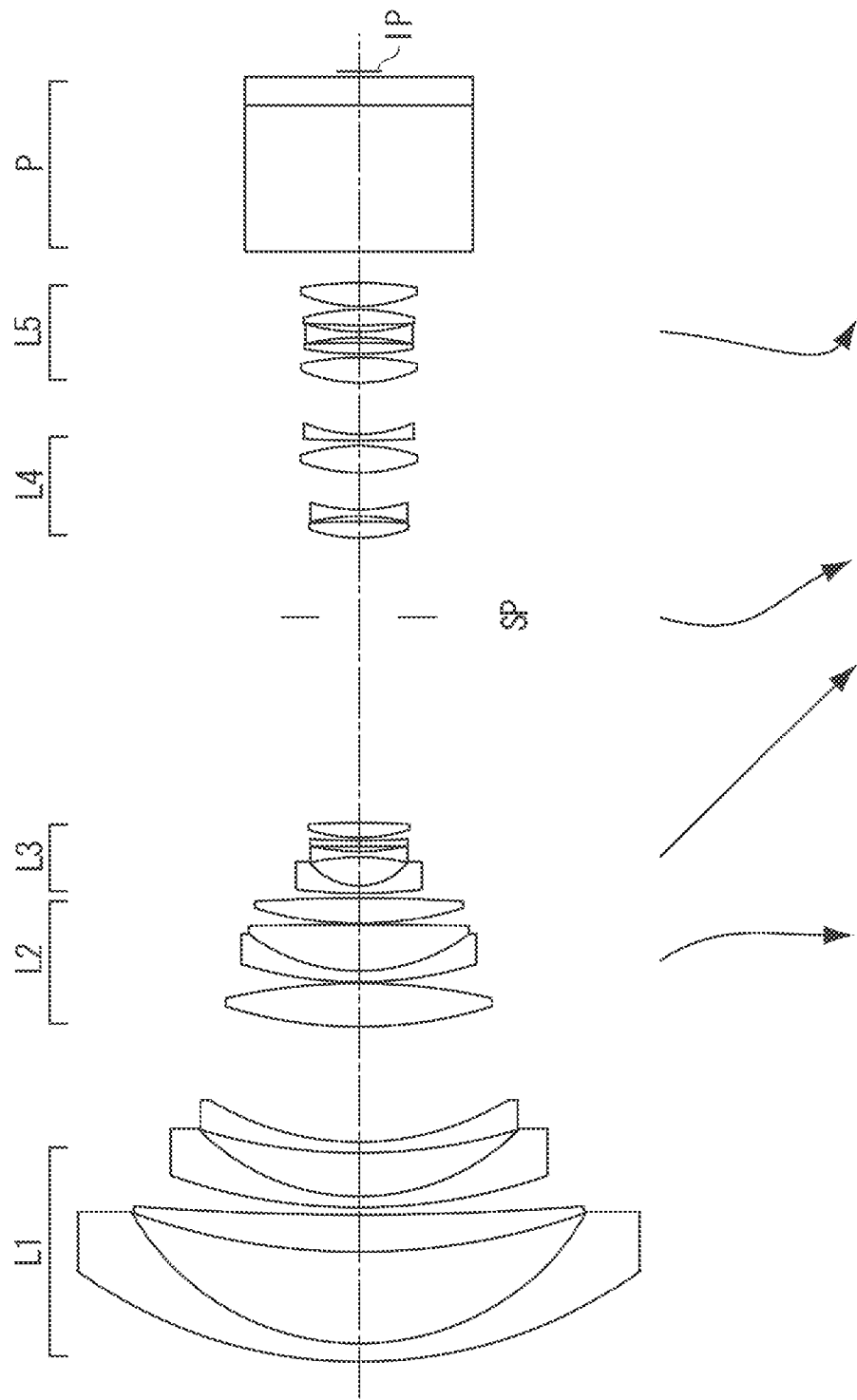

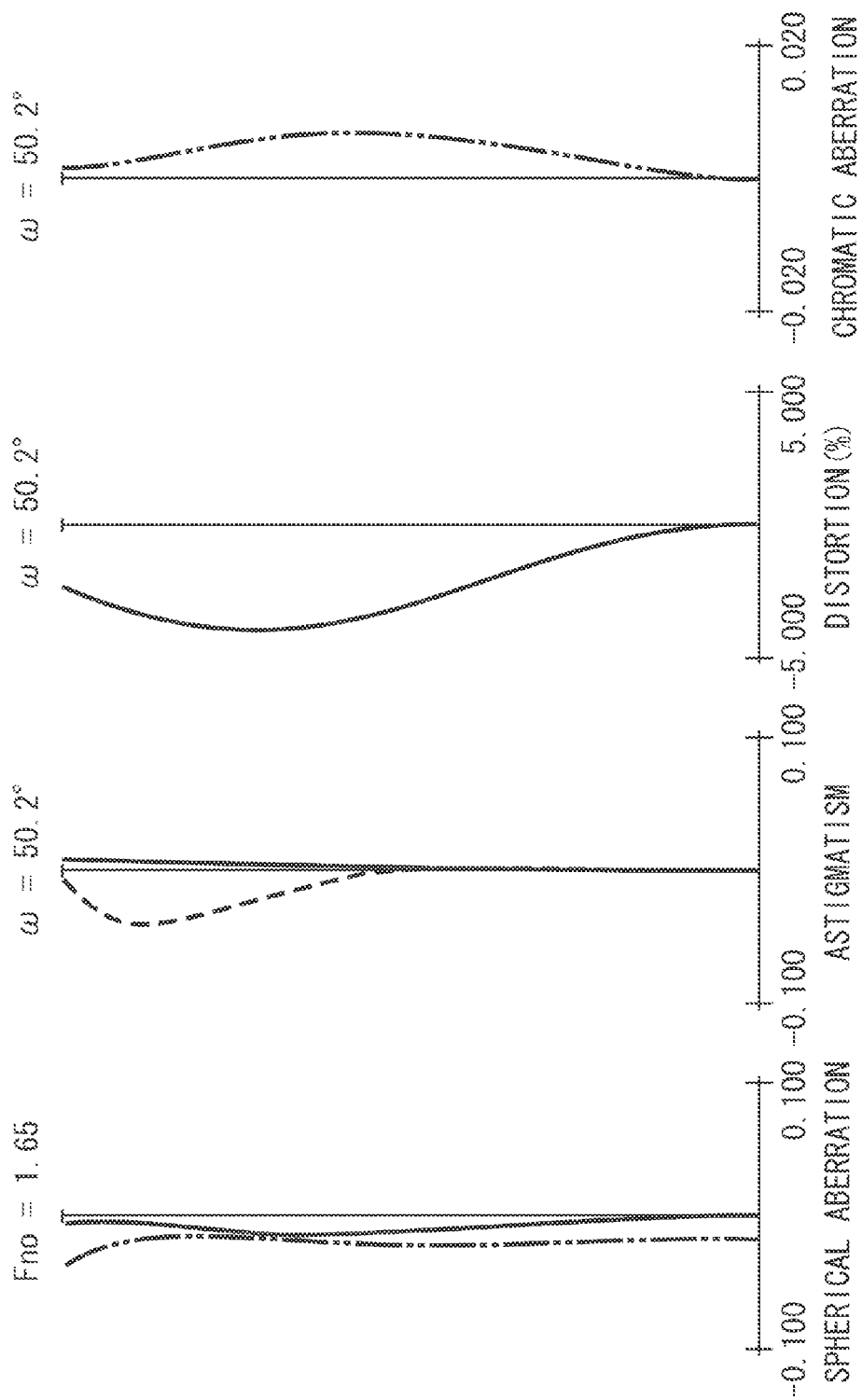

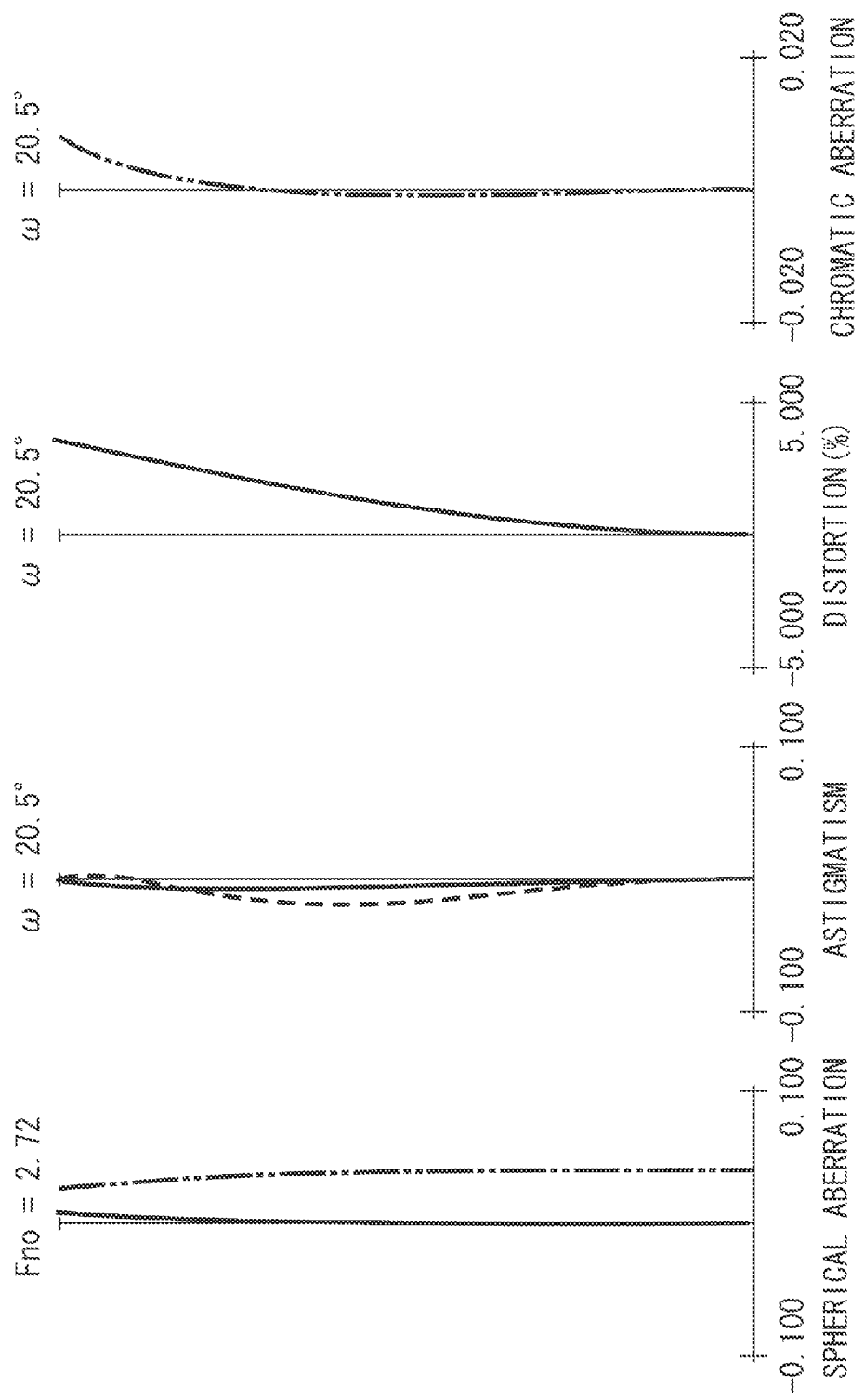

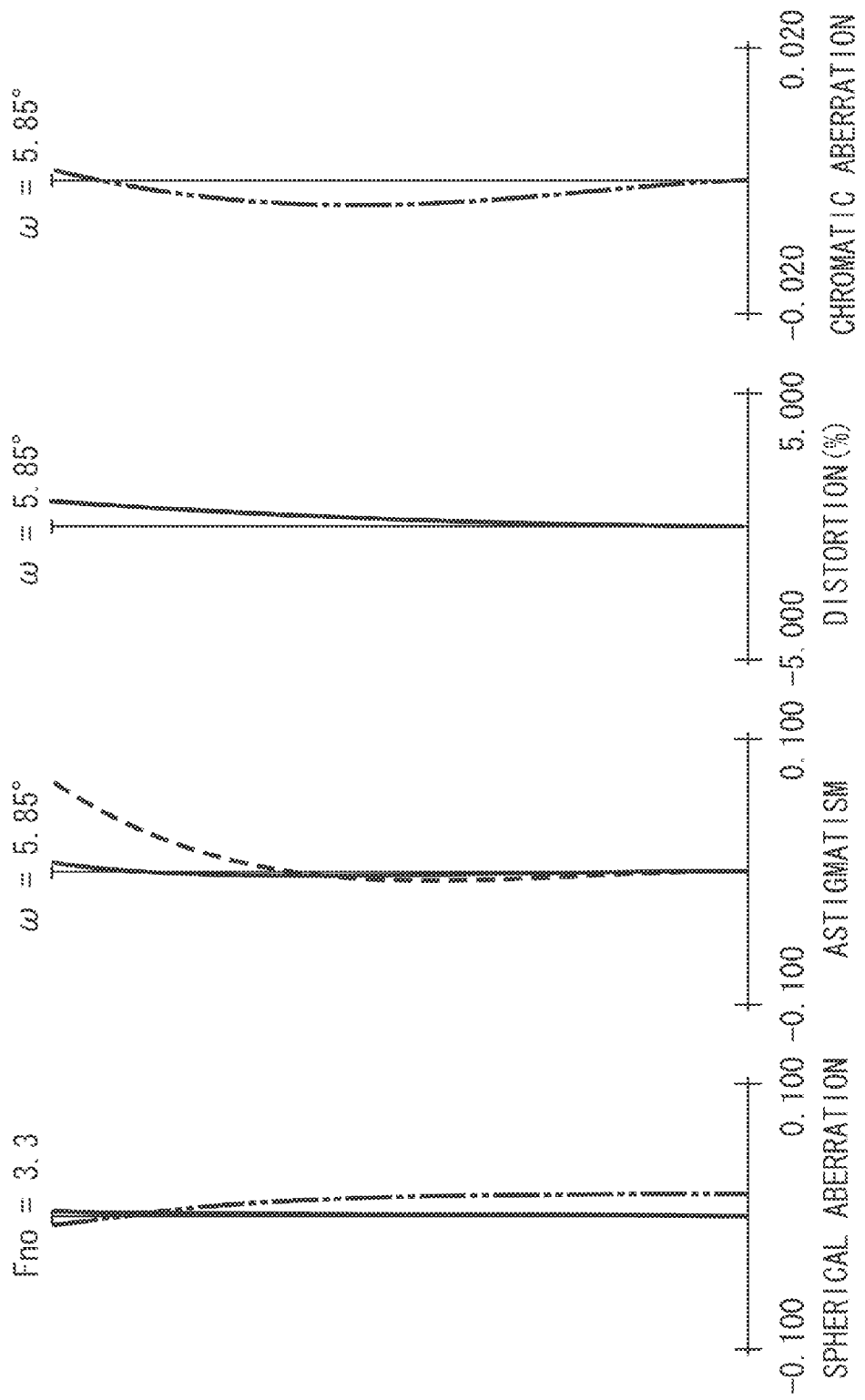

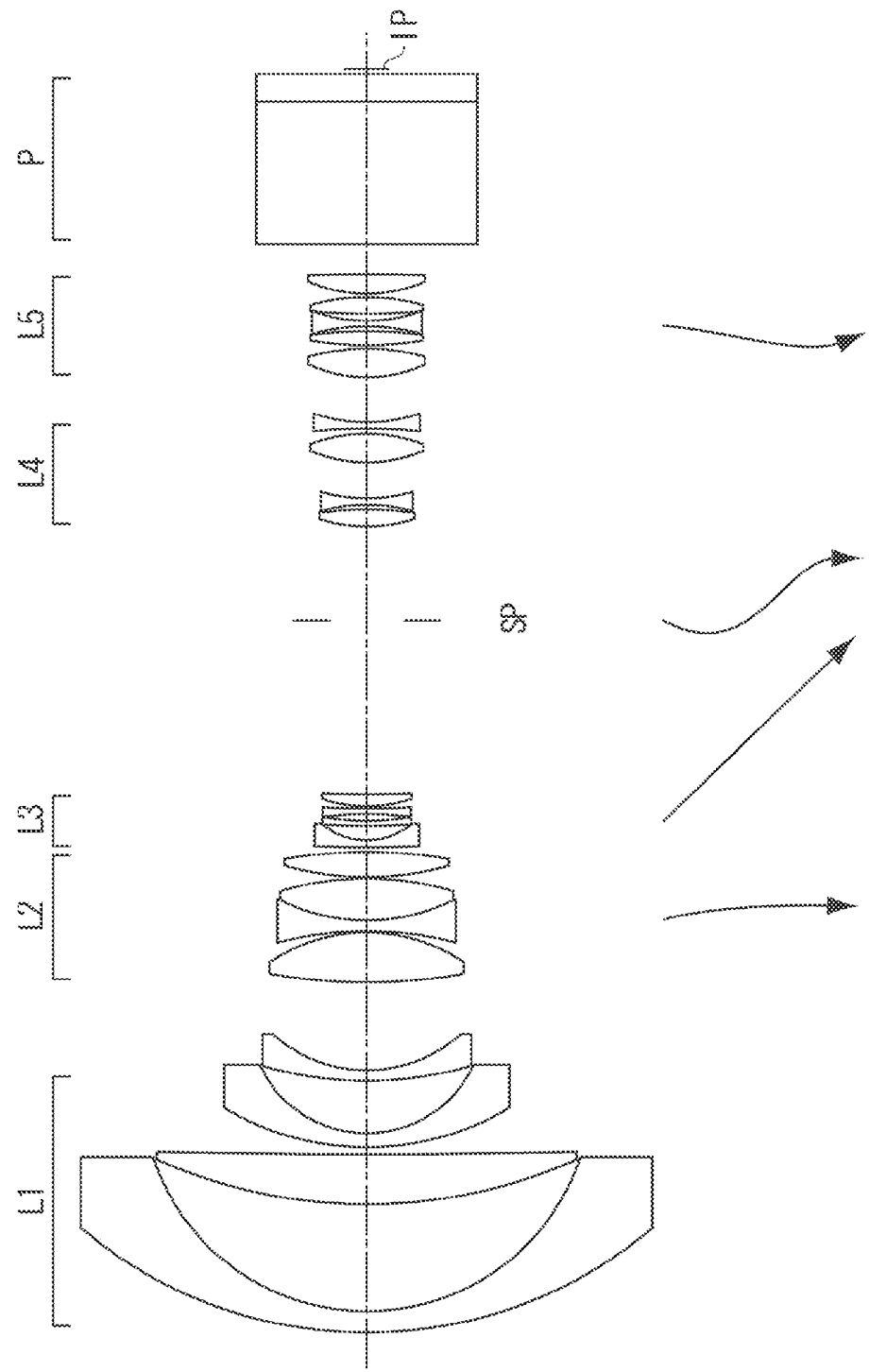

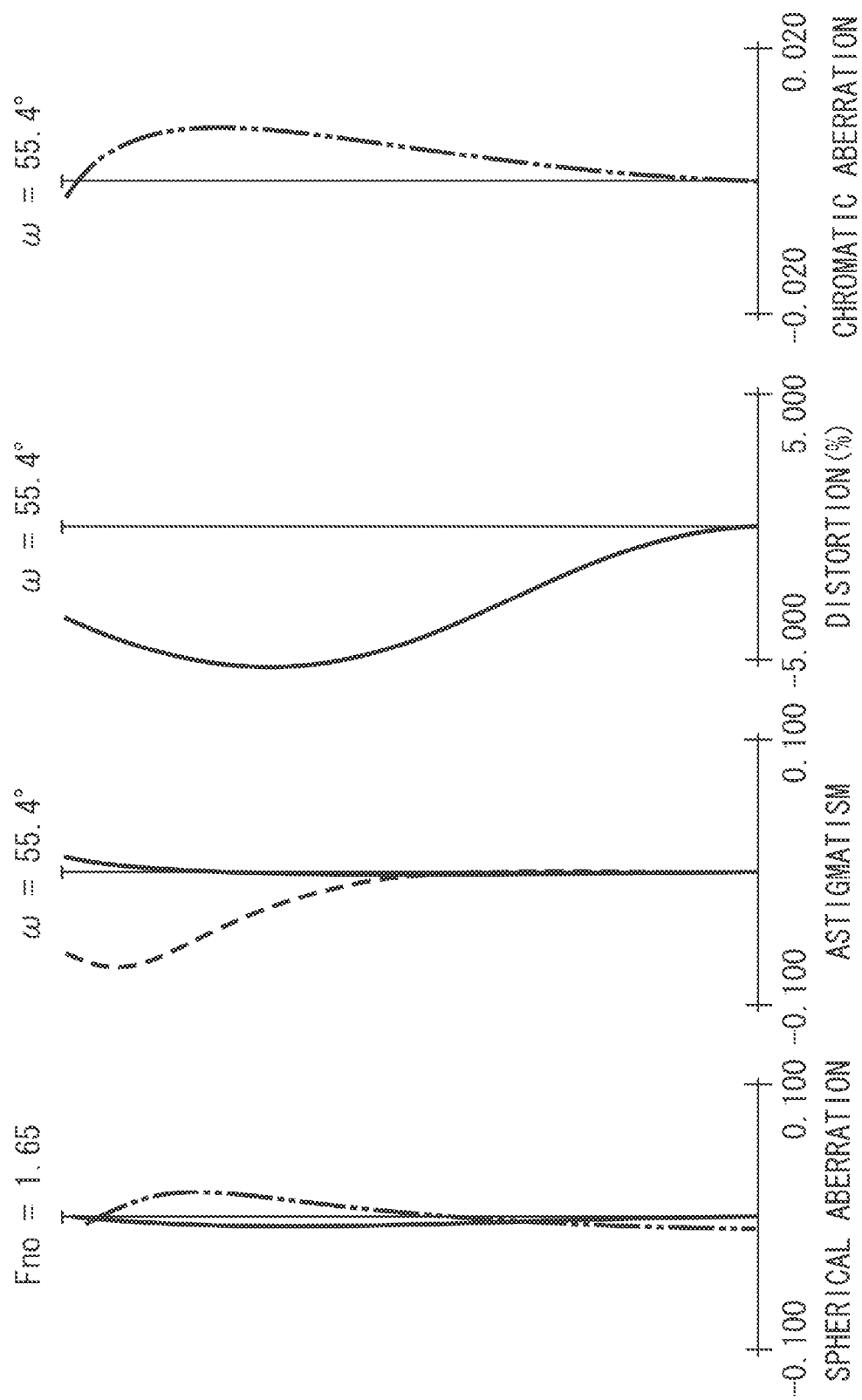

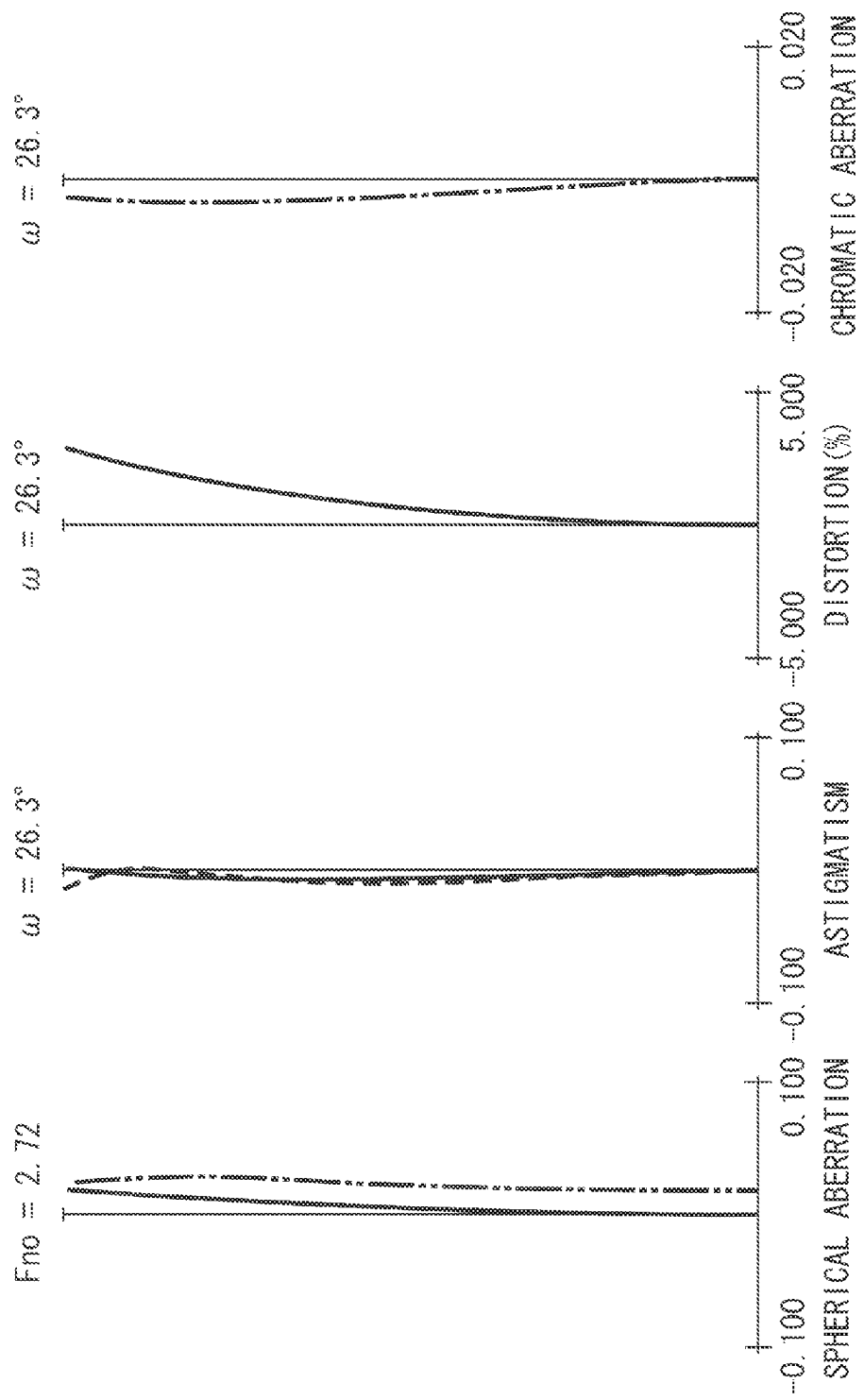

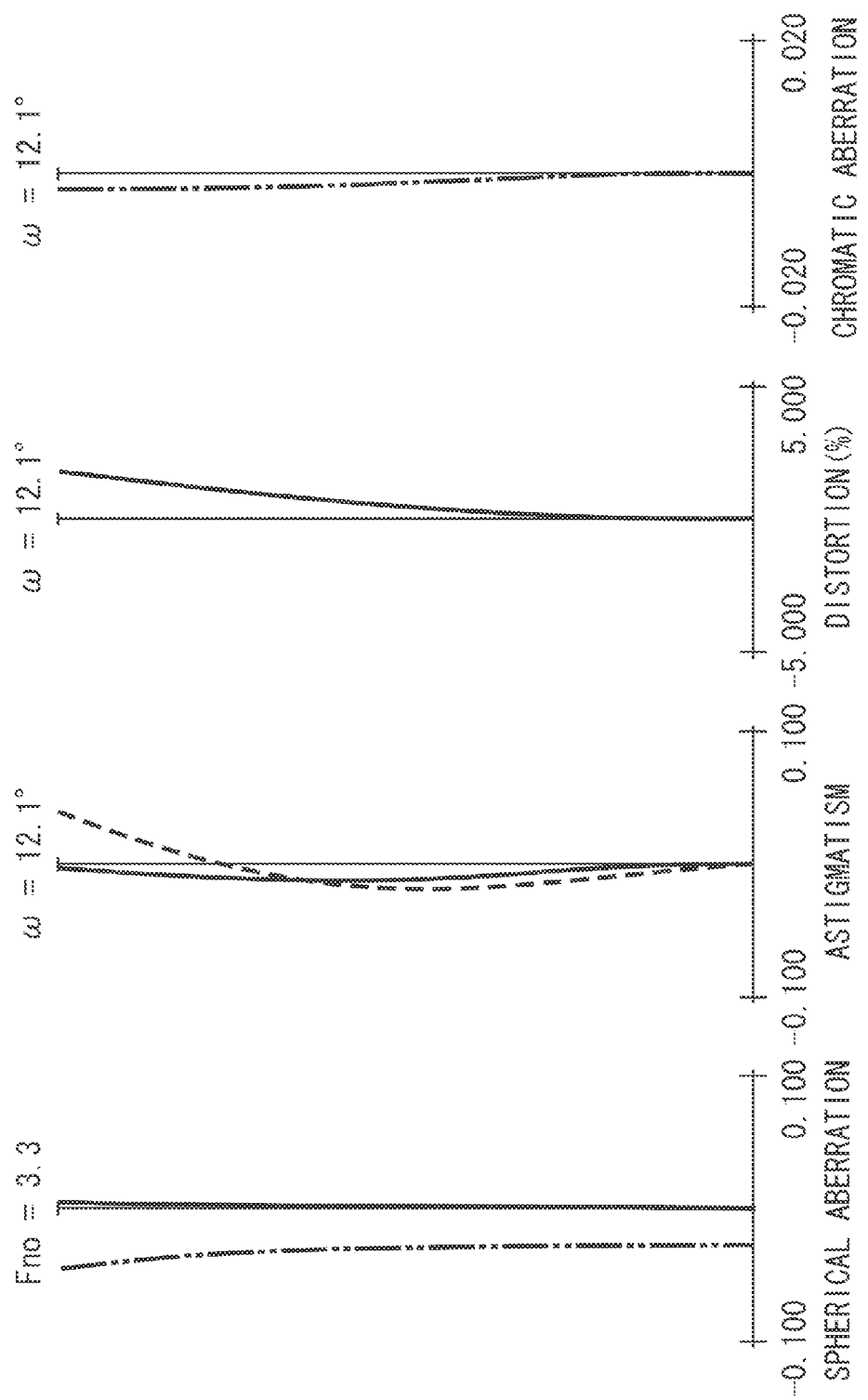

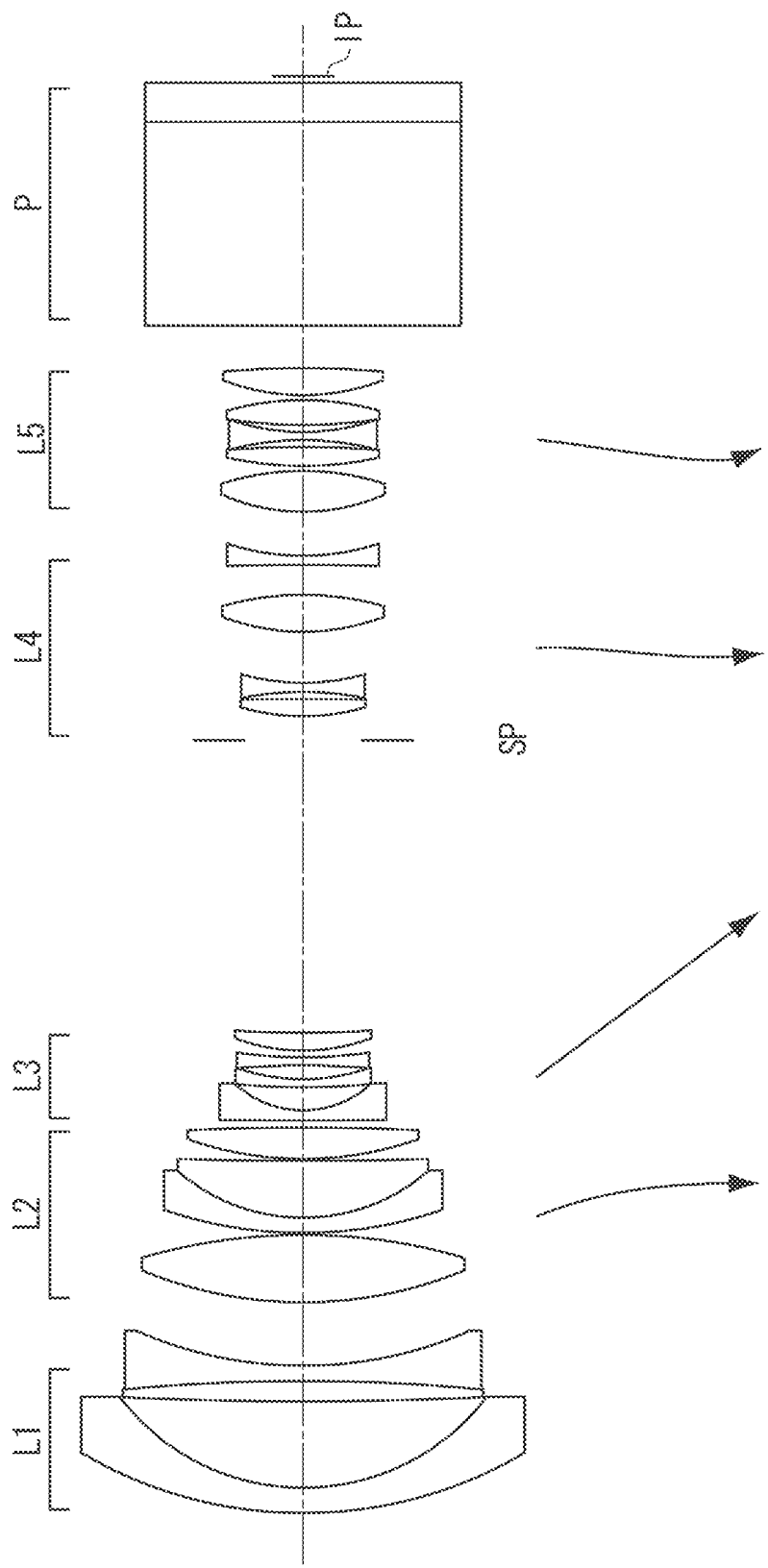

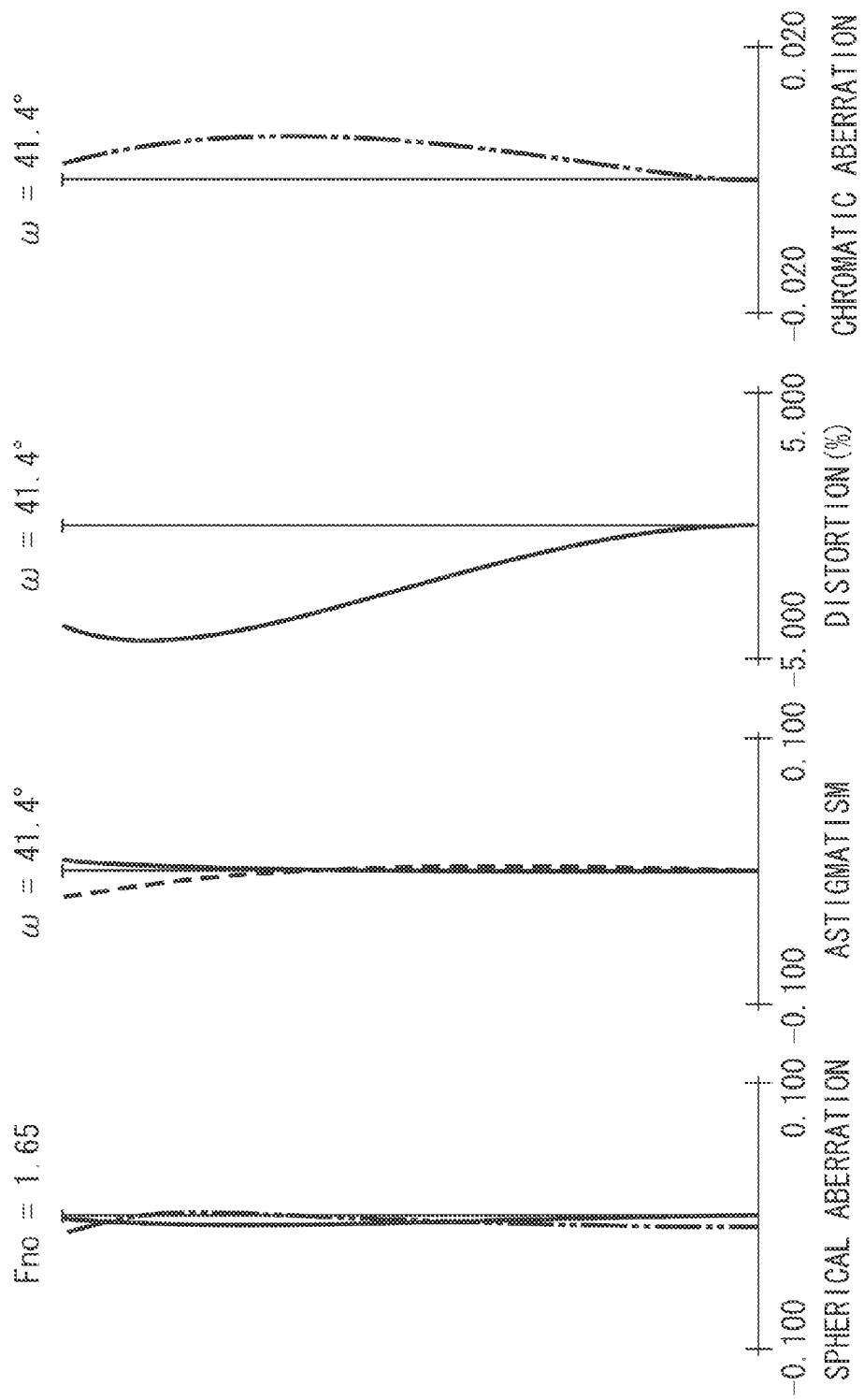

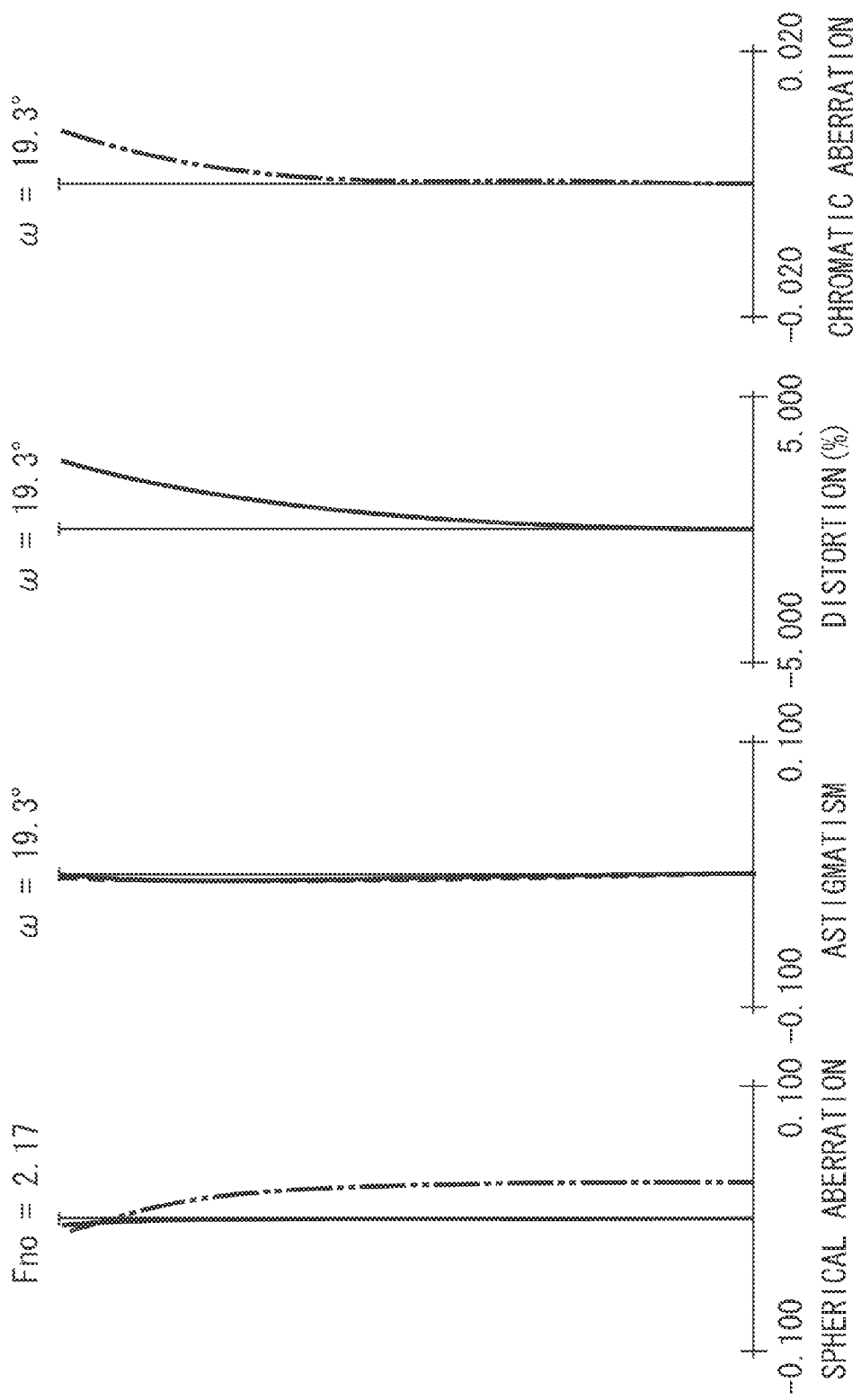

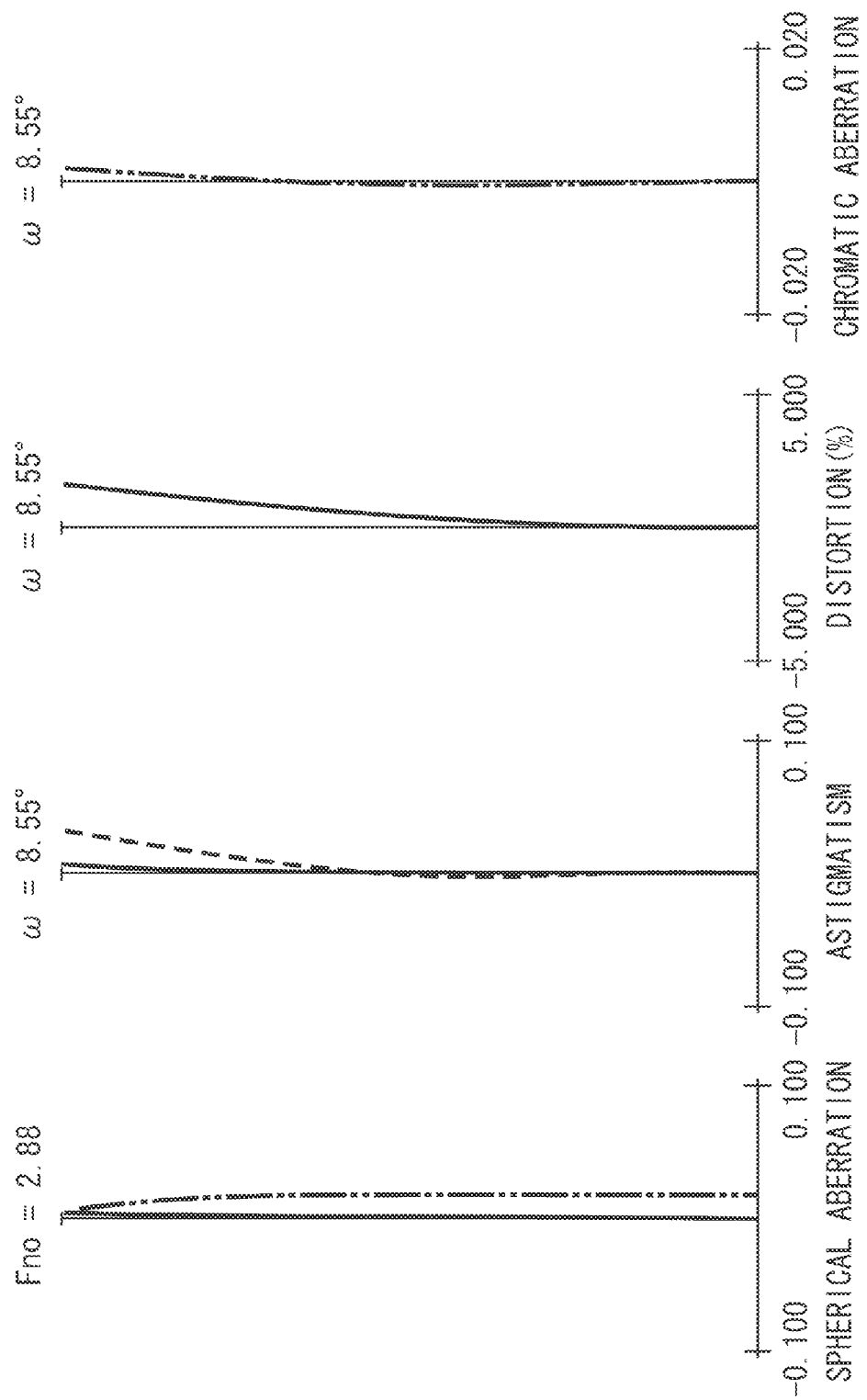

ZOOM LENS AND IMAGE PICKUP APPARATUS HAVING THE ZOOM LENS

BACKGROUND OF THE INVENTION

1. Field of the Invention

The present invention relates to a zoom lens and an image pickup apparatus having the zoom lens. More specifically, the present invention relates to a zoom lens useful as a photographic optical system used in an image pickup apparatus, such as a digital camera, a video camera, a silver-halide film camera, or a television (TV) camera, and an image pickup apparatus having the zoom lens.

2. Related Background Art

A conventional negative-lead type zoom lens includes a lens unit having negative refractive power provided at a location closest to the object side. This conventional configuration allows the negative-lead type zoom lens to achieve a wide angle of view and a long back focus. Accordingly, in an image pickup apparatus, a negative-lead type zoom lens is often used as a photographic lens having a wide angle of view.

An example of a negative-lead type zoom lens is described in U.S. Pat. No. 4,730,908. U.S. Pat. No. 4,730,908 discusses a five-unit zoom lens, which is constituted by five lens units including, in order from the object side to the image side, a first lens unit having a negative refractive power, a second lens unit having a positive refractive power, a third lens unit having a negative refractive power, a fourth lens unit having a positive refractive power, and a fifth lens unit having a positive refractive power. In the zoom lens discussed in U.S. Pat. No. 4,730,908, the second through the fourth lens units are moved during zooming.

In addition, U.S. Patent Application Publication No. US 2010/0053765 discusses a zoom lens having a wide angle of view which is constituted by, five lens units including, in order from the object side to the image side, a first lens unit having a negative refractive power, a second lens unit having a positive refractive power, a third lens unit having a positive refractive power, a fourth lens unit having a negative refractive power, and a fifth lens unit having a positive refractive power. In the zoom lens discussed in U.S. Patent Application Publication No. US 2010/0053765, the second through the fourth lens units are moved during zooming.

A conventional characteristic of the negative-lead type zoom lens is that it has a lens configuration asymmetry to the aperture stop. Accordingly, if a negative-lead type zoom lens is used, it is difficult to correct variation of various aberrations (in particular, curvature of field, distortion, and chromatic aberration of magnification) during zooming. In addition, in this case, it is difficult to achieve a high optical performance for the entire zooming range.

Furthermore, if the angle of view is broadened and the zoom ratio is increased, the effective diameter of the front lens (i.e., the effective diameter of the first lens unit) is likely to become large. Accordingly, it becomes difficult to reduce the total size of the optical system.

In order to achieve a high optical performance for the entire zooming range in a small-size negative-lead type zoom lens while achieving a wide angle of view, it is desirable to appropriately set the configuration of the lens units, the refractive power assigned to each lens unit, and a condition for moving a magnification-varying lens unit during zooming. In particular, in the negative-lead type five-unit zoom lens described above, it is highly desirable to appropriately set the focal lengths of the first and the second lens units and a condition for moving the second lens unit during zooming.

SUMMARY OF THE INVENTION

The present invention is directed to a zoom lens having a wide angle of view and a high zoom ratio and capable of achieving a high optical performance for the entire zooming range, and an image pickup apparatus having the zoom lens.

According to an aspect of the present invention, a zoom lens includes, in order from an object side to an image side, a first lens unit having a negative refractive power, a second lens unit having a positive refractive power, a third lens unit having a negative refractive power, a fourth lens unit having a positive or negative refractive power, and a fifth lens unit having a positive refractive power. In the zoom lens, the first lens unit is stationary during zooming. At least the second lens unit, the third lens unit, and the fifth lens unit move along an optical axis during zooming. Furthermore, in the zoom lens, when fw is a focal length of the entire zoom lens at a wide-angle end and m2z is an amount of movement of the second lens unit during zooming from the wide-angle end to a telephoto end, the following condition is satisfied:

$$0.2 < fw/m2z < 1.5.$$

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 1 is a lens cross section of a zoom lens at the wide-angle end according to a first exemplary embodiment of the present invention.

FIGS. 2A, 2B, and 2C illustrate aberration charts of the zoom lens at the wide-angle end, at the middle focal length, and at the telephoto end, respectively, according to a numerical example 1, which corresponds to the first exemplary embodiment of the present invention.

FIG. 3 is a lens cross section of a zoom lens at the wide-angle end according to a second exemplary embodiment of the present invention.

FIGS. 4A, 4B, and 4C are aberration charts of the zoom lens at the wide-angle end, at the middle focal length, and at the telephoto end, respectively, according to a numerical example 2, which corresponds to the second exemplary embodiment.

FIG. 5 is a lens cross section of a zoom lens at the wide-angle end according to a third exemplary embodiment of the present invention.

FIGS. 6A, 6B, and 6C are aberration charts of the zoom lens at the wide-angle end, at the middle focal length, and at the telephoto end, respectively, according to a numerical example 3, which corresponds to the third exemplary embodiment.

FIG. 7 is a lens cross section of a zoom lens at the wide-angle end according to a fourth exemplary embodiment of the present invention.

FIGS. 8A, 8B, and 8C are aberration charts of the zoom lens at the wide-angle end, at the middle focal length, and at the telephoto end, respectively, according to a numerical example 4, which corresponds to the fourth exemplary embodiment.

DESCRIPTION OF THE EMBODIMENTS

Figure 9:
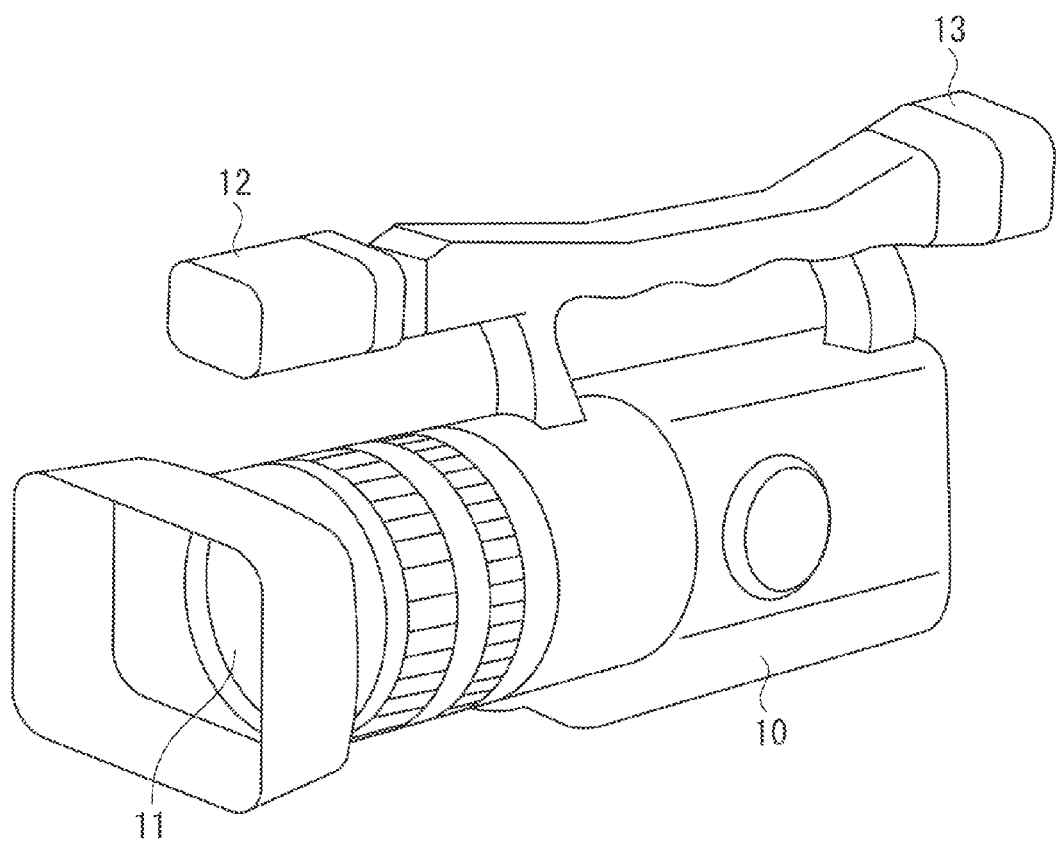
FIG. 9 illustrates main components of a video camera as an example of an image pickup apparatus that can use a zoom lens according to an exemplary embodiment of the present invention when the zoom lens is applied as an optical system of the video camera.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed in subsequent figures.

Note that herein when referring to correcting or corrections of an error (e.g., aberration), a reduction of the error and/or a correction of the error is intended. In addition, as used herein, the side of a lens where an object to be imaged is located is referred to as the object side or front side of the lens; and the side of the lens where the image of the object is formed is referred to as the image side or back side of the lens.

A zoom lens according to an exemplary embodiment of the present invention includes, in order from the object side to the image side, a first lens unit having a negative refractive power, a second lens unit having a positive refractive power, a third lens unit having a negative refractive power, a fourth lens unit having a positive or negative refractive power, and a fifth lens unit having a positive refractive power. During zooming, the first lens unit is stationary while at least the second lens unit, the third lens unit, and the fifth lens unit move along the optical axis.

More specifically, during zooming from the wide-angle end to the telephoto end, the second lens unit moves towards the image side or along a locus convex towards the image side. The third lens unit moves towards the image side. The fifth lens unit moves along a locus convex towards the object side.

FIG. 1 illustrates a lens cross section of a zoom lens at the wide-angle end (short focal length end) according to a first exemplary embodiment of the present invention. FIGS. 2A, 2B, and 2C are aberration charts of the zoom lens at the wide-angle end, at the middle focal length, and at a telephoto end (long focal length end), respectively, according to the first exemplary embodiment. According to the first exemplary embodiment, a zoom lens is configured to have a zoom ratio of 9.77 and an aperture ratio (F-number) ranging from 1.65 to 2.88.

FIG. 3 is a lens cross section of a zoom lens at the wide-angle end according to a second exemplary embodiment of the present invention. FIGS. 4A, 4B, and 4C are aberration charts of the zoom lens at the wide-angle end, at the middle focal length, and at the telephoto end, respectively, according to the second exemplary embodiment. The second exemplary embodiment is a zoom lens having a zoom ratio of 11.69 and an aperture ratio (F-number) ranging from 1.65 to 3.30.

FIG. 5 is a lens cross section of a zoom lens at the wide-angle end according to a third exemplary embodiment of the present invention. FIGS. 6A, 6B, and 6C are aberration charts of the zoom lens at the wide-angle end, at the middle focal length, and at the telephoto end, respectively, according to the third exemplary embodiment. The third exemplary embodiment is a zoom lens having a zoom ratio of 6.77 and an aperture ratio (F-number) ranging from 1.65 to 3.30.

FIG. 7 is a lens cross section of a zoom lens at the wide-angle end according to a fourth exemplary embodiment of the present invention. FIGS. 8A, 8B, and 8C are aberration charts of the zoom lens at the wide-angle end, at the middle focal length, and at the telephoto end, respectively, according to the fourth exemplary embodiment. The fourth exemplary embodiment is a zoom lens having a zoom ratio of 5.86 and an aperture ratio (F-number) ranging from 1.65 to 2.88.

FIG. 9 illustrates main components of an image pickup apparatus having a photoelectrical conversion element configured to receive an image formed by the zoom lens according to an exemplary embodiment of the present invention. The zoom lens according to each exemplary embodiment is a photographic lens system used on an image pickup apparatus, such as a video camera, a digital camera, or a silver-halide film camera.

In each of the diagrams showing a cross section of the zoom lens (FIGS. 1, 3, 5, and 7), an object side (front side) is shown at the left-hand portion of the drawing, and an image side (rear side) is shown at the right-hand portion thereof. If the zoom lens according to each exemplary embodiment of the present invention is used as a projection lens for a projector, in each of the diagrams showing a cross section of the zoom lens (FIGS. 1, 3, 5, and 7), the side of a screen is shown at the left-hand portion of the drawing, and the side of an image to be projected is shown at the right-hand portion thereof.

Furthermore, in each of the diagrams showing a cross section of the zoom lens (FIGS. 1, 3, 5, and 7), "i" (where i=1, 2, 3 . . . ) denotes an order of a lens unit from the object side. "Li" denotes an i-th lens unit. Specifically, in each of the lens cross sections of the zoom lens according to the first through the fourth exemplary embodiments (FIGS. 1, 3, 5, and 7), "L1" denotes a first lens unit L1 having a negative refractive power (optical power=an inverse of the focal length), "L2" denotes a second lens unit L2 having a positive refractive power, "L3" denotes a third lens unit L3 having a negative refractive power, "L4" denotes a fourth lens unit having a positive or negative refractive power, and "L5" denotes a fifth lens unit having a positive refractive power.

Furthermore, "SP" denotes an aperture stop, which is provided between the third lens unit L3 and the fourth lens unit L4. "P" denotes an optical block, such as an optical filter, a faceplate, a crystal low-pass filter, an infrared cut filter, or a prism. "IP" denotes an image plane. The image plane IP is, when the zoom lens according to an exemplary embodiment of the present invention is used as a photographic optical system of a video camera or a digital still camera, equivalent to an imaging plane of a solid-state image sensor (photoelectric conversion element), such as a charge-coupled device (CCD) sensor or a complementary metal-oxide semiconductor (CMOS) sensor. If the zoom lens according to an exemplary embodiment of the present invention is used as a photographic optical system of a silver-halide film camera, the image plane IP is a photosensitive surface equivalent to a film surface of the optical system of the silver-halide film camera.

In each aberration chart (FIGS. 2A through 2C, 4A through 4C, 6A through 6C, and 8A through 8C), a solid line and an alternate long and two short dashes line respectively denote d-line and g-line light, respectively. In a portion of each aberration chart (FIGS. 2A through 2C, 4A through 4C, 6A through 6C, and 8A through 8C) showing astigmatism, a meridional image plane and a sagittal image plane are represented by a dashed line and a solid line, respectively. In a portion of each aberration chart (FIGS. 2A through 2C, 4A through 4C, 6A through 6C, and 8A through 8C) showing chromatic aberration of magnification, g-line light is represented by an alternate long and two short dashes line. "ω" denotes a half angle of view. "Fno" denotes an F-number.

In each of the following exemplary embodiments, each of the wide-angle end and the telephoto end respectively refers to a zooming position when a magnification-varying lens unit (the third lens unit L3) is positioned at each of the ends of a range in which the magnification varying lens unit can mechanically move along the optical axis. In each exemplary embodiment, during zooming from the wide-angle end to the telephoto end, predetermined lens units are moved as indicated by an arrow in the corresponding drawing. In addition, during zooming, the aperture stop SP is stationary or moves independently from the other lens units or integrally with the fourth lens unit L4.

In the first exemplary embodiment illustrated in FIG. 1, during zooming from the wide-angle end to the telephoto end, the second lens unit L2 moves towards the image side. The third lens unit L3 moves towards the image side. The fifth lens unit L5 moves along a locus convex towards the object side. The aperture stop SP is stationary.

In the second exemplary embodiment illustrated in FIG. 3, during zooming from the wide-angle end to the telephoto end, the second lens unit L2 moves along a locus convex towards the image side. The third lens unit L3 moves towards the image side. The fifth lens unit L5 moves along a locus convex towards the object side. The aperture stop SP moves nonlinearly independently from the lens units.

In the third exemplary embodiment illustrated in FIG. 5, during zooming from the wide-angle end to the telephoto end, the second lens unit L2 moves towards the image side. The third lens unit L3 moves towards the image side. The aperture stop SP moves nonlinearly independently from the lens units. The fifth lens unit L5 moves along a locus convex towards the object side.

In the fourth exemplary embodiment illustrated in FIG. 7, during zooming from the wide-angle end to the telephoto end, the second lens unit L2 moves towards the image side. The third lens unit L3 moves towards the image side. The fourth lens unit L4 moves towards the object side integrally with the aperture stop SP. As used herein, "integrally" means that the aperture stop SP and fourth lens unit L4 move together as an integrated unit so as to follow the same direction and path of movement. The fifth lens unit L5 moves along a locus convex towards the object side.

In each exemplary embodiment, focusing is implemented by a rear focus method, which is executed by the fifth lens unit L5. In the zoom lens according to each exemplary embodiment, the first lens unit L1, which is the lens unit located closest to the object to be imaged, is assigned with a negative refractive power to easily achieve a wide angle of view. On the image side of the first lens unit L1, the second lens unit L2 having a positive refractive power, a third lens unit L3 having a negative refractive power, a fourth lens unit L4 having a positive or negative refractive power, and a fifth lens unit L5 having a positive refractive power are arranged along an unlabeled optical axis.

The lens units which move during zooming will be described in detail below. In general, in order to correct variation of various off-axial aberrations that may occur during zooming, such as curvature of field, distortion, or chromatic aberration of magnification, a lens in which a ray is incident at a height sufficiently distant from the optical axis can be used. In other words, it is useful to move a lens located away from the aperture stop SP along the optical axis according to variation of the focal length of the entire optical system.

However, in a zoom lens having a wide angle of view and whose back focus is long, a ray that determines an axial F-number (Fno) at the wide-angle end is incident to a lens, which is located at a location close to the image plane, through the periphery of the lens. As a result, it is very difficult to effectively correct both variation of various off-axial variations, such as curvature of field, distortion, or chromatic aberration of magnification that may occur during zooming and various axial aberrations, such as spherical aberration or axial chromatic aberration at the same time. Therefore, it is useful to correct the variation of curvature of field, distortion, and chromatic aberration of magnification that may occur during zooming by using a lens unit located close to the object side.

On the other hand, in order to achieve a zoom lens capable of shooting a moving image with a high optical performance, it is not effective if the first lens unit L1 moves during zooming because the photographer may clean the front lens by hand during shooting and pressure is applied to the zoom lens in this case. In addition, it is not useful to move the first lens unit L1 during zooming because if the first lens unit L1 is moved during zooming, a captured image may be blurred due to the tilt of the lens unit that may occur when the first lens unit L1 is driven.

Furthermore, if a wide-angle converter is installed around the first lens unit L1, the first lens unit L1 and the wide-angle converter may interfere with each other during zooming. In shooting a still image, the above-described problems may not become conspicuous during a shooting operation because the time for shooting a still image is short. However, the problems may become more serious when serially (continuous) recording moving images.

In order to prevent the above-described problem, i.e., in order to achieve a zoom lens useful for shooting a moving image as well as a still image, the first lens unit L1 of the zoom lens according to each exemplary embodiment is stationary during zooming. Furthermore, the third lens unit L3 is moved for variable magnification. In addition, the fifth lens unit L5 is moved to effectively correct variation on the image plane that may occur during variable magnification. Moreover, the second lens unit L2 is moved to effectively correct variation of various aberrations, such as curvature of field, distortion, or chromatic aberration of magnification that may occur during zooming.

In the zoom lens according to each exemplary embodiment, a focal length of the entire zoom lens at the wide-angle end (fw) and an amount of movement of the second lens unit L2 during zooming from the wide-angle end to the telephoto end (m2z) satisfy the following condition:

$$0.2 < fw/m2z < 1.5 \tag{1}.$$

The sign of the amount of movement of the lens unit is positive when the amount of displacement (the positional difference) of the lens unit from the image plane in the direction of the optical axis exists closer to the image plane at the telephoto end than at the wide-angle end. On the other hand, the sign of the amount of movement of the lens unit is negative when the amount of displacement (the positional difference) of the lens unit from the image plane in the direction of the optical axis exists closer to the object side at the telephoto end than at the wide-angle end.

The condition (1) provides a condition for the moving amount of the second lens unit L2 during zooming. The second lens unit L2 is located close to the first lens unit L1 at the wide-angle end. Accordingly, the zoom lens according to each exemplary embodiment prevents the front lens from having a large effective diameter.

If the upper limit value of the condition (1) is exceeded, then the amount of movement of the second lens unit L2 may become small. As a result, it becomes difficult to correct variation of chromatic aberration of magnification at the wide-angle end and at the telephoto end.

On the other hand, if the lower limit value of the condition (1) is exceeded, then the variable magnification cannot be efficiently executed. Furthermore, the amount of movement of the third lens unit L3 during zooming may increase. As a result, the total length of the optical system may increase.

In order to effectively correct aberration, it is further useful if the range of the value in the condition (1) is altered as follows:

$$0.3 < fw/m2z < 1.0 \quad (1a).$$

As described above, each exemplary embodiment can achieve a zoom lens capable of effectively correcting variation of various aberrations during zooming, having a wide angle of view and whose effective diameter of the front lens is small.

It is further useful if the zoom lens according to each exemplary embodiment satisfies at least one of the following conditions. A focal length of the first lens unit L1 (f1), a focal length of the second lens unit L2 (f2), a combined focal length of the third lens unit L3 through the fifth lens unit L5 at the wide-angle end (f3rw), and an amount of movement of the second lens unit L2 from the wide-angle end when the third lens unit L3 has moved half from the wide-angle end, of the amount of movement of the third lens unit L3 during zooming from the wide-angle end to the telephoto end (m2h) satisfy at least one of the following conditions:

$$0.5 < |f2/f1| < 2.1 \quad (2)$$

$$0.3 < fw/f3rw < 1.2 \quad (3)$$

$$0.6 < m2h/m2z < 1.5 \quad (4).$$

The technical significance of each of the conditions (2) through (4) will be described in detail below. The condition (2) provides a condition for the ratio of the focal length of the second lens unit L2 to the focal length of the first lens unit L1.

If the upper limit value of the condition (2) is exceeded, then the following is required to achieve a wide shooting angle of view at the wide-angle end and a high zoom ratio. In other words, in this case, it is required to increase the space between the first lens unit L1 and the second lens unit L2 at the wide-angle end to vary the combined focal length and the combined principal point position of the first lens unit L1 and the second lens unit L2. As a result, the total length of the optical system may increase.

On the other hand, if the lower limit value of the condition (2) is exceeded, then the power assigned to the first lens unit L1 having a negative refractive power may become too low to achieve a wide angle of view. As a result, it becomes necessary to achieve a wide angle of view by appropriately setting the configuration of the second through the fifth lens units. In other words, in this case, the load of powers assigned to each of the second through the fifth lens units may increase. As a result, a large amount of various aberrations, such as chromatic aberration of magnification, may occur at the wide-angle end.

The condition (3) provides a condition for the ratio of the focal length of the entire optical system at the wide-angle end to the combined focal length of the third lens unit through the fifth lens unit. If the upper limit value of the condition (3) is exceeded, then the power assigned to the first lens unit having a negative refractive power cannot be high enough to achieve a wide angle of view. In addition, the load of power assigned to the third through the fifth lens units to achieve a wide angle of view may increase.

As a result, it becomes difficult to correct various aberrations, such as distortion and astigmatic, particularly at the wide-angle end. In addition, because the angle of light incident from the second lens unit to the third lens unit becomes steep at the wide-angle end, the effective diameter of the second lens unit L2 may become large.

On the other hand, if the lower limit value of the condition (3) is exceeded, then the first lens unit L1 can contribute greatly to achieve a wide angle of view. However, in this case, in order to secure a sufficiently long back focus, which has been shortened due to the bias of the negative refractive power on the object side, the positive refractive power of the fourth lens unit L4 may necessarily be reduced and it becomes necessary to increase the refractive power of the fifth lens unit L5. As a result, the location of the exit pupil may be moved in the positive direction. Accordingly, the effective diameter of the fifth lens unit L5 may become very large.

The condition (4) provides a condition for the ratio of the amount of movement of the second lens unit L2 halfway from the wide-angle end during variable magnification to the amount of the entire movement of the second lens unit L2 from the wide-angle end to the telephoto end. If the second lens unit L2 moves closer to the image side at the telephoto end than at the wide-angle end, it becomes easier to correct chromatic aberration of magnification.

However, during variable magnification at its halfway, in which the direction of chromatic aberration of magnification of short and long wavelengths is reverse to that at the wide-angle end, if the amount of movement of the second lens unit L2 towards the image side is extremely larger at the telephoto end than at the wide-angle end, then chromatic aberration of magnification may increase.

On the other hand, during variable magnification halfway, the amount of negative distortion occurring in the first lens unit L1 is smaller than the amount of negative distortion occurring at the wide-angle end. Accordingly, if the second lens unit L2 is located closer to the object side, the amount of positive distortion occurring in the second lens unit L2 becomes large. As a result, the total amount of positive distortion occurring in the entire optical system may become large.

Accordingly, it is useful if, during variable magnification halfway, the second lens unit L2 is positioned at a location within a range in which only tolerable amounts of both chromatic aberration of magnification and distortion may occur.

If the upper limit value of the condition (4) is exceeded, then it becomes difficult to correct chromatic aberration of magnification at the focal length of a position to which the second lens unit L2 has moved from its initial position by the moving amount m2h or around. On the other hand, if the lower limit value of the condition (4) is exceeded, then it becomes difficult to correct distortion at the focal length of a position to which the second lens unit L2 has moved from its initial position by the moving amount m2h or around.

In order to effectively correct aberration, it is yet further useful if the ranges of the values in the conditions (2) through (4) are altered as follows:

$$0.6<|f2/f1|<1.9 \quad (2a)$$

$$0.4<fw/f3rw<1.1 \quad (3a)$$

$$0.7<m2h/m2z<1.2 \quad (4a)$$

In addition, in each exemplary embodiment, the first lens unit L1 can include a negative lens, which is provided at a location closest to the object side, whose absolute value of refractive power is larger on the object side than on the image side, and another negative lens provided at a location closest to the image side. Furthermore, the second lens unit L2 can include three or less positive lenses including a positive lens provided at a location closest to the object side and both of whose surfaces have a convex shape.

In each exemplary embodiment, as described above, the first lens unit L1 includes at least two negative lenses. Accordingly, each exemplary embodiment can reduce the amount of aberrations occurring on each negative lens. In particular, the refractive power of the lens surface on the image side of the negative lens of the first lens unit L1 provided closest to the object side is stronger than the refractive power thereof on the object side. Accordingly, each exemplary embodiment can effectively reduce the amount of distortion.

In general, in order to effectively correct spherical aberration and coma occurring at the telephoto end, it is useful if the second lens unit L2 has as many positive lenses as possible. On the other hand, it is desired to reduce the weight of a lens unit that moves during zooming as possible. Accordingly, in each exemplary embodiment, the number of positive lenses of the second lens unit L2 is restricted to three or less, which is the minimum number of lenses to correct aberrations.

In each exemplary embodiment, a negative lens is provided to the first lens unit L1 at a location closest to the image side. In addition, the positive lens is provided to the second lens unit L2 at a location closest to the object side. With the above-described configuration, each exemplary embodiment can vary the amount of curvature of field particularly at the telephoto end when the space between the first lens unit L1 and the second lens unit L2 has varied. Accordingly, each exemplary embodiment can effectively correct the amount of variation of curvature of field that may occur when the second lens unit L2 is moved for variable magnification.

Numerical examples 1 through 4, which respectively correspond to the first through the fourth exemplary embodiments of the present invention, are set forth below. In each of the numerical examples 1 through 4, "i" (where i= 1, 2, 3 . . . ) denotes the order of a surface from the object side to the image side, "ri" denotes a radius of curvature of an i-th optical surface (the i-th lens surface), "di" denotes an axial space between the i-th surface and the (i+1)-th surface (the lens thickness or the air space separating two consecutive lens units), "ndi" and "vdi" respectively denote a refractive index and an Abbe number of the material of the i-th lens with respect to d-line light.

When a given surface is an aspheric surface, such a surface is denoted by an asterisk (*) next to the surface number. In addition, each of "k", "A4", "A6", and "A8" denotes an aspheric coefficient. The aspheric shape is expressed as $$X=\{(1/R)h^2)\}/[1+\{1-(1+k)(h/R)^2\}^{1/2}]+A4\cdot h^4+A6\cdot h^6+A8\cdot h^8$$

where "X" denotes a displacement from a surface vertex along the optical axis in a position at a height "h" from the optical axis, and "R" denotes a paraxial radius of curvature. Each of "a", "b", "c", "d", "e", and "f" denotes a movement coefficient. The amount of movement of the second lens unit L2 (m2) is expressed as $$m2=aZp+bZp^2+cZp^3+dZp^4+eZp^5+fZp^6$$

where "Zp" denotes a ratio of movement of the third lens unit L3 from the wide-angle end to the telephoto end, which has a positive value when the third lens unit L3 is moved towards the image side. The scientific notation "e-Z" for each aspheric coefficient is equivalent to the exponential notation "$1\times 10^{-Z}$". In each numerical example, each of the last three surfaces is a glass surface (parallel flat surface), such as a filter or a prism. The relationship between each condition described above and each numerical example is set forth in Table 1.

NUMERICAL EXAMPLE 1

| | Unit: mm | | | |
|---|---|---|---|---|
| | Surface Data | | | |
| Surface No. | r | d | nd | vd |
| 1 | 85.331 | 2.50 | 1.88300 | 40.8 |
| 2 | 31.859 | 12.68 | | |
| 3 | −228.030 | 2.93 | 1.92286 | 18.9 |
| 4 | −86.360 | 3.96 | | |
| 5 | −51.285 | 1.85 | 1.90366 | 31.3 |
| 6 | −156.673 | Variable | | |
| 7 | 100.266 | 7.00 | 1.80400 | 46.6 |
| 8 | −74.830 | 0.20 | | |
| 9 | 62.701 | 1.49 | 2.00069 | 25.5 |
| 10 | 31.584 | 7.01 | 1.49700 | 81.5 |
| 11 | −226.654 | 0.20 | | |
| 12 | 32.089 | 4.20 | 1.60311 | 60.6 |
| 13 | 191.381 | Variable | | |
| 14 | 99.100 | 1.00 | 1.88300 | 40.8 |
| 15 | 10.315 | 3.35 | | |
| 16 | 74.292 | 0.80 | 1.77250 | 49.6 |
| 17 | 18.909 | 2.07 | | |
| 18 | −59.384 | 0.80 | 1.71300 | 53.9 |
| 19 | 65.102 | 1.00 | | |
| 20 | 22.133 | 1.98 | 1.92286 | 18.9 |
| 21 | 115.082 | Variable | | |
| 22 (Stop) | ∞ | 2.75 | | |
| 23 | 43.028 | 1.29 | 1.92286 | 18.9 |
| 24 | −159.642 | 0.70 | | |
| 25 | −128.856 | 0.90 | 2.00069 | 25.5 |
| 26 | 18.938 | 5.00 | | |
| 27* | 20.986 | 3.43 | 1.68893 | 31.1 |
| 28 | −34.495 | 3.06 | | |
| 29 | −156.327 | 0.90 | 1.69680 | 55.5 |
| 30 | 43.583 | Variable | | |
| 31 | 33.344 | 4.00 | 1.49700 | 81.5 |
| 32 | −24.923 | 0.50 | | |
| 33 | 37.517 | 1.85 | 1.59282 | 68.6 |
| 34 | −107.865 | 0.68 | | |
| 35 | −31.636 | 0.80 | 2.00069 | 25.5 |
| 36 | 26.065 | 0.69 | | |
| 37 | 63.525 | 2.32 | 1.51633 | 64.1 |
| 38 | −29.766 | 0.49 | | |
| 39 | 29.808 | 2.57 | 1.65844 | 50.9 |
| 40 | −48.254 | Variable | | |

-continued

Unit: mm

| | | | | |
|---|---|---|---|---|
| 41 | ∞ | 20.00 | 1.58913 | 61.2 |
| 42 | ∞ | 3.85 | 1.51633 | 64.1 |
| 43 | ∞ | 1.00 | | |
| Image plane | ∞ | | | |

Aspheric Coefficients r27  K = −8.79901e−001  A4 = −1.40973e−005  A6 = 6.54251e−009
A8 = −8.95308e−011

Various Data
Zoom Ratio 9.77

| | Wide-angle end | Middle Focal Length | Telephoto end |
|---|---|---|---|
| Focal Length | 3.40 | 8.94 | 33.26 |
| F-number | 1.65 | 2.17 | 2.88 |
| Angle of View | 41.39 | 18.55 | 5.15 |
| Image Height | 3.00 | 3.00 | 3.00 |
| Lens Total Length | 157.78 | 157.78 | 157.78 |
| BF | 20.32 | 23.00 | 20.32 |
| d6 | 0.50 | 9.73 | 10.50 |
| d13 | 0.67 | 15.64 | 27.91 |
| d21 | 39.48 | 15.28 | 2.25 |
| d30 | 9.86 | 7.18 | 9.86 |
| d40 | 4.20 | 6.88 | 4.20 |

Various Data of Each Unit

| Lens unit | First surface | Focal length |
|---|---|---|
| 1 | 1 | −42.51 |
| 2 | 7 | 29.18 |
| 3 | 14 | −10.71 |
| 4 | 22 | 143.90 |
| 5 | 31 | 22.14 |
| 6 | 41 | ∞ |

Data of Second Lens Unit L2 Moving Amount a = 1.89791e+001   b = 1.46325e+001   c = −6.87142e+001
d = 6.84223e+001   e = −2.14662e+001   f = −1.85407e+000

NUMERICAL EXAMPLE 2

Unit: mm

Surface Data

| Surface No. | r | d | nd | vd |
|---|---|---|---|---|
| 1 | 64.751 | 2.49 | 1.90366 | 31.3 |
| 2 | 35.669 | 12.52 | | |
| 3 | 90.978 | 5.03 | 1.92286 | 18.9 |
| 4 | 414.150 | 0.99 | | |
| 5 | 76.842 | 1.49 | 1.90366 | 31.3 |
| 6 | 30.252 | 5.90 | | |
| 7 | 73.530 | 1.50 | 1.90366 | 31.3 |
| 8 | 38.280 | Variable | | |
| 9 | 59.610 | 5.88 | 1.71300 | 53.9 |
| 10 | −80.277 | 0.20 | | |
| 11 | 52.807 | 1.49 | 1.90366 | 31.3 |
| 12 | 24.666 | 6.29 | 1.49700 | 81.5 |
| 13 | −800.047 | 0.20 | | |
| 14 | 46.681 | 3.49 | 1.69680 | 55.5 |
| 15 | −214.965 | Variable | | |
| 16 | 73.578 | 1.00 | 1.88300 | 40.8 |
| 17 | 8.634 | 3.88 | | |
| 18 | −30.101 | 0.80 | 1.88300 | 40.8 |
| 19 | 30.433 | 0.66 | | |
| 20 | 463.445 | 0.80 | 1.80400 | 46.6 |
| 21 | 101.183 | 0.41 | | |
| 22 | 22.738 | 1.98 | 1.92286 | 18.9 |
| 23 | −154.007 | Variable | | |
| 24 (Stop) | ∞ | Variable | | |
| 25 | 20.059 | 2.25 | 1.92286 | 18.9 |
| 26 | −83.065 | 0.69 | | |
| 27 | −27.269 | 0.90 | 2.00330 | 28.3 |
| 28 | 23.483 | 5.00 | | |
| 29* | 21.413 | 3.66 | 1.68893 | 31.1 |
| 30 | −25.098 | 0.69 | | |
| 31 | 98.893 | 0.89 | 2.00069 | 25.5 |
| 32 | 18.933 | Variable | | |
| 33 | 19.559 | 3.49 | 1.49700 | 81.5 |
| 34 | −34.809 | 0.49 | | |
| 35 | 40.104 | 1.54 | 1.48749 | 70.2 |
| 36 | −158.877 | 0.69 | | |
| 37 | −30.448 | 0.80 | 2.00069 | 25.5 |
| 38 | 23.916 | 0.90 | | |
| 39 | 121.514 | 2.09 | 1.65844 | 50.9 |
| 40 | −26.189 | 0.49 | | |
| 41 | 19.895 | 3.15 | 1.60311 | 60.6 |
| 42 | −49.272 | Variable | | |
| 43 | ∞ | 20.00 | 1.58913 | 61.2 |
| 44 | ∞ | 3.85 | 1.51633 | 64.1 |
| 45 | ∞ | 1.00 | | |
| Image plane | ∞ | | | |

Aspheric Coefficients r29  K = −6.04805e−001  A4 = −1.63984e−005  A6 = 2.26542e−009
A8 = 1.27939e−011

Various Data
Zoom Ratio 11.69

| | Wide-angle end | Middle Focal Length | Telephoto end |
|---|---|---|---|
| Focal Length | 2.50 | 8.01 | 29.26 |
| F-number | 1.65 | 2.72 | 3.30 |
| Angle of View | 50.16 | 20.53 | 5.85 |
| Image Height | 3.00 | 3.00 | 3.00 |
| Lens Total Length | 167.37 | 167.37 | 167.37 |
| BF | 20.33 | 24.08 | 20.33 |
| d8 | 15.73 | 20.44 | 20.08 |
| d15 | 0.68 | 18.01 | 30.24 |
| d23 | 28.02 | 8.71 | 2.25 |
| d24 | 10.89 | 8.15 | 2.75 |
| d32 | 6.99 | 3.23 | 6.99 |
| d42 | 4.20 | 7.96 | 4.20 |

Various Data of Each Unit

| Lens unit | First surface | Focal length |
|---|---|---|
| 1 | 1 | −27.59 |
| 2 | 9 | 27.07 |
| 3 | 16 | −9.84 |
| 4 | 24 | ∞ |
| 5 | 25 | 236.70 |
| 6 | 33 | 19.71 |
| 7 | 43 | ∞ |

Data of Second Lens Unit L2 Moving Amount a = 2.13184e+001   b = −1.33058e+001   c = −5.07356e+001
d = 7.54497e+001   e = −2.28201e+001   f = −5.55740e+000

NUMERICAL EXAMPLE 3

Unit: mm

Surface Data

| Surface No. | r | d | nd | vd |
|---|---|---|---|---|
| 1 | 61.557 | 3.00 | 1.90366 | 31.3 |
| 2 | 31.500 | 15.01 | | |
| 3 | 71.031 | 7.01 | 1.92286 | 18.9 |
| 4 | 1201.205 | 0.98 | | |
| 5 | 38.440 | 1.99 | 1.90366 | 31.3 |
| 6 | 16.472 | 7.34 | | |
| 7 | 50.571 | 1.50 | 1.90366 | 31.3 |
| 8 | 19.622 | Variable | | |
| 9 | 75.307 | 7.00 | 1.60311 | 60.6 |
| 10 | −23.818 | 0.20 | | |
| 11 | −47.950 | 1.50 | 1.90366 | 31.3 |
| 12 | 26.505 | 5.89 | 1.60342 | 38.0 |
| 13 | −40.872 | 0.20 | | |
| 14 | 41.125 | 3.49 | 1.69680 | 55.5 |
| 15 | −68.846 | Variable | | |
| 16 | 150.004 | 1.00 | 1.88300 | 40.8 |
| 17 | 9.797 | 1.95 | | |
| 18 | 82.490 | 0.80 | 1.88300 | 40.8 |
| 19 | 34.594 | 0.92 | | |
| 20 | −46.375 | 0.80 | 1.83481 | 42.7 |
| 21 | 164.820 | 0.29 | | |
| 22 | 19.296 | 1.63 | 1.92286 | 18.9 |
| 23 | 137.191 | Variable | | |
| 24 (Stop) | ∞ | Variable | | |
| 25 | 21.756 | 2.37 | 1.92286 | 18.9 |
| 26 | −43.338 | 0.69 | | |
| 27 | −22.383 | 0.90 | 2.00330 | 28.3 |
| 28 | 23.211 | 5.00 | | |
| 29* | 18.960 | 4.05 | 1.68893 | 31.1 |
| 30 | −21.913 | 0.70 | | |
| 31 | −82.299 | 0.90 | 2.00330 | 28.3 |
| 32 | 22.531 | Variable | | |
| 33 | 18.995 | 4.01 | 1.49700 | 81.5 |
| 34 | −28.286 | 0.49 | | |
| 35 | 44.698 | 1.94 | 1.62299 | 58.2 |
| 36 | −60.407 | 0.68 | | |
| 37 | −27.523 | 0.80 | 2.00069 | 25.5 |
| 38 | 21.328 | 0.99 | | |
| 39 | 73.814 | 2.31 | 1.71300 | 53.9 |
| 40 | −28.334 | 0.49 | | |
| 41 | 20.098 | 2.74 | 1.69680 | 55.5 |
| 42 | −198.164 | Variable | | |
| 43 | ∞ | 20.00 | 1.58913 | 61.2 |
| 44 | ∞ | 3.85 | 1.51633 | 64.1 |
| 45 | ∞ | 1.00 | | |
| Image plane | ∞ | | | |

Aspheric Coefficients

| r29 | K = −8.63394e−001 | A4 = −1.31276e−005 |
|---|---|---|
| | A6 = −5.20647e−008 | A8 = −1.27987e−010 |

Various Data
Zoom Ratio 6.77

| | Wide-angle end | Middle Focal Length | Telephoto end |
|---|---|---|---|
| Focal Length | 2.07 | 6.06 | 14.01 |
| F-number | 1.65 | 2.72 | 3.30 |
| Angle of View | 55.38 | 26.33 | 12.08 |
| Image Height | 3.00 | 3.00 | 3.00 |
| Lens Total Length | 168.85 | 168.85 | 168.85 |
| BF | 20.33 | 23.69 | 22.55 |
| d8 | 12.31 | 14.33 | 14.54 |
| d15 | 0.68 | 19.89 | 31.10 |
| d23 | 24.42 | 8.75 | 2.75 |
| d24 | 13.22 | 7.67 | 2.25 |
| d32 | 6.32 | 2.96 | 4.10 |
| d42 | 4.21 | 7.57 | 6.43 |

Various Data of Each Unit

| Lens unit | First surface | Focal length |
|---|---|---|
| 1 | 1 | −13.62 |
| 2 | 9 | 23.85 |
| 3 | 16 | −13.23 |
| 4 | 24 | ∞ |
| 5 | 25 | −500.76 |
| 6 | 33 | 18.45 |
| 7 | 43 | ∞ |

Data of Second Lens Unit L2 Moving Amount a = 4.42445e+000   b = 1.66036e+001   c = −8.54150e+001
d = 1.49597e+002   e = −1.19776e+002   f = 3.67915e+001

NUMERICAL EXAMPLE 4

Unit: mm

Surface Data

| Surface No. | r | d | nd | vd |
|---|---|---|---|---|
| 1 | 42.429 | 2.50 | 1.88300 | 40.8 |
| 2 | 22.513 | 8.49 | | |
| 3 | 382.913 | 2.00 | 1.84666 | 23.9 |
| 4 | −179.884 | 1.50 | 1.90366 | 31.3 |
| 5 | 40.101 | Variable | | |
| 6 | 40.878 | 6.62 | 1.60342 | 38.0 |
| 7 | −55.400 | 0.20 | | |
| 8 | 41.431 | 1.50 | 1.84666 | 23.9 |
| 9 | 18.625 | 5.58 | 1.48749 | 70.2 |
| 10 | 387.123 | 0.20 | | |
| 11 | 33.478 | 3.08 | 1.74400 | 44.8 |
| 12 | −240.224 | Variable | | |
| 13 | 687.031 | 1.00 | 1.88300 | 40.8 |
| 14 | 9.777 | 2.25 | | |
| 15 | 68.652 | 0.80 | 1.77250 | 49.6 |
| 16 | 19.413 | 1.35 | | |
| 17 | −70.965 | 0.80 | 1.71300 | 53.9 |
| 18 | 44.502 | 0.65 | | |
| 19 | 18.575 | 1.75 | 1.92286 | 18.9 |
| 20 | 97.695 | Variable | | |
| 21 (Stop) | ∞ | 2.38 | | |
| 22 | 21.325 | 1.68 | 1.92286 | 18.9 |
| 23 | −387.249 | 0.70 | | |
| 24 | −29.767 | 0.90 | 2.00330 | 28.3 |
| 25 | 21.954 | 5.00 | | |
| 26* | 20.801 | 3.65 | 1.68893 | 31.1 |
| 27 | −28.138 | 2.94 | | |
| 28 | −238.258 | 0.90 | 1.83400 | 37.2 |
| 29 | 23.346 | Variable | | |
| 30 | 19.450 | 4.01 | 1.48749 | 70.2 |
| 31 | −25.408 | 0.49 | | |
| 32 | 33.338 | 1.85 | 1.60311 | 60.6 |
| 33 | −96.142 | 0.68 | | |
| 34 | −27.650 | 0.80 | 2.00069 | 25.5 |
| 35 | 21.446 | 0.70 | | |
| 36 | 48.563 | 2.45 | 1.60311 | 60.6 |
| 37 | −26.652 | 0.49 | | |

-continued

Unit: mm

| | | | | |
|---|---|---|---|---|
| 38 | 21.395 | 2.65 | 1.69680 | 55.5 |
| 39 | −87.853 | Variable | | |
| 40 | ∞ | 20.00 | 1.58913 | 61.2 |
| 41 | ∞ | 3.85 | 1.51633 | 64.1 |
| 42 | ∞ | 1.00 | | |
| Image plane | ∞ | | | |

Aspheric Coefficients

| | | |
|---|---|---|
| r26 | K = −6.26476e−001 | A4 = −1.35973e−005 |
| | A6 = −3.81927e−009 | A8 = −1.15496e−010 |

Various Data
Zoom Ratio 5.86

| | Wide-angle end | Middle Focal Length | Telephoto end |
|---|---|---|---|
| Focal Length | 3.40 | 8.58 | 19.95 |
| F-number | 1.65 | 2.17 | 2.88 |
| Angle of View | 41.39 | 19.26 | 8.55 |
| Image Height | 3.00 | 3.00 | 3.00 |
| Lens Total Length | 132.82 | 132.82 | 132.82 |
| BF | 20.33 | 23.39 | 22.49 |
| d5 | 6.23 | 10.75 | 11.33 |
| d12 | 0.69 | 12.57 | 20.83 |
| d20 | 28.73 | 11.17 | 2.69 |
| d29 | 4.32 | 2.41 | 2.95 |
| d39 | 4.20 | 7.27 | 6.37 |

Various Data of Each Unit

| Lens unit | First surface | Focal length |
|---|---|---|
| 1 | 1 | −24.35 |
| 2 | 6 | 21.94 |
| 3 | 13 | −10.04 |
| 4 | 21 | −255.33 |
| 5 | 30 | 17.70 |
| 6 | 40 | ∞ |

Data of Second Lens Unit L2 Moving Amount

| | | |
|---|---|---|
| a = 1.01823e+001 | b = 1.46060e+001 | c = −6.61462e+001 |
| d = 6.94578e+001 | e = −1.88471e+001 | f = −4.15288e+000 |

TABLE 1

| | Numerical Example | | | |
|---|---|---|---|---|
| Condition | 1 | 2 | 3 | 4 |
| (1) | 0.34 | 0.58 | 0.93 | 0.67 |
| (2) | 0.69 | 0.98 | 1.75 | 0.90 |
| (3) | 1.01 | 0.71 | 0.45 | 0.89 |
| (4) | 0.81 | 1.13 | 0.84 | 0.82 |

With the above-described configuration, each exemplary embodiment of the present invention can achieve a zoom lens having a high zoom ratio and a wide angle of view, which is capable of effectively correcting variation on the image plane occurring during variable magnification and whose effective diameter of the front lens is small.

An exemplary embodiment of a video camera (image pickup apparatus) that uses a zoom lens according to any exemplary embodiment of the present invention as a photographic optical system thereof will be described below with reference to FIG. 9.

Referring to FIG. 9, the video camera includes a camera body 10 and a photographic optical system 11. The photographic optical system 11 includes the zoom lens according to any of the first through the fourth exemplary embodiments described above.

The camera body 10 further includes a sound-collecting microphone 12. In addition, the camera body 10 also includes a viewfinder 13, via which a user of the video camera can observe an object image displayed on a display device (not illustrated). The display device includes a liquid crystal display (LCD) panel and displays the object image formed by the photographic optical system 11.

By applying the zoom lens according to each exemplary embodiment of the present invention to an image pickup apparatus, such as a video camera, the present invention can implement a small-size image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-117965 filed May 24, 2010, which is hereby incorporated by reference herein in its entirety.

What is claimed is:

1. A zoom lens comprising, in order from an object side to an image side:

a first lens unit having a negative refractive power;
a second lens unit having a positive refractive power;
a third lens unit having a negative refractive power;
a fourth lens unit having a positive or negative refractive power; and
a fifth lens unit having a positive refractive power,
wherein the first lens unit is stationary during zooming,
wherein at least the second lens unit, the third lens unit, and the fifth lens unit move along an optical axis during zooming, and
wherein, when fw is a focal length of the entire zoom lens at a wide-angle end and m2z is an amount of movement of the second lens unit during zooming from the wide-angle end to a telephoto end, and
wherein a sign of the amount of movement m2z is positive when the second lens unit is positioned closer to the image plane at the telephoto end than at the wide-angle end and the sign of the amount of movement m2z is negative when the second lens unit is positioned close to the object side at the telephoto end than at the wide-angle end,
the following condition is satisfied:

$$0.2 < fw/m2z < 1.5.$$

2. The zoom lens according to claim 1, wherein, when f1 is a focal length of the first lens unit and f2 is a focal length of the second lens unit, the following condition is satisfied:

$$0.5 < |f2/f1| < 2.1.$$

3. The zoom lens according to claim 1, wherein the first lens unit includes a first negative lens located closest to an object to be imaged and having an absolute value of refractive power larger on the image side than on the object side, and a second negative lens located closest to the image side, and
wherein the second lens unit includes three or fewer positive lenses including a positive lens that has both surfaces of a convex shape and which is located closest to the object side.

4. The zoom lens according to claim 1, wherein, when fw is a focal length of the entire zoom lens at the wide-angle end and f3rw is a combined focal length of the third lens unit through the fifth lens unit at the wide-angle end, the following condition is satisfied:

$$0.3 < fw/f3rw < 1.2.$$

5. The zoom lens according to claim 1, wherein, when m2h is an amount of movement of the second lens unit from the wide-angle end to a middle focal length, the middle focal length being a focal length when the third lens unit has moved from the wide-angle end by half of the amount of movement of the third lens unit during zooming from the wide-angle end to the telephoto end, and m2z is the amount of movement of the second lens unit during zooming from the wide-angle end to the telephoto end, the following condition is satisfied:

$$0.6 < m2h/m2z < 1.5.$$

6. The zoom lens according to claim 1, wherein, during zooming from the wide-angle end to the telephoto end, the second lens unit moves towards the image side or along a locus convex towards the image side, the third lens unit moves towards the image side, and the fifth lens unit moves along a locus convex towards the object side.

7. The zoom lens according to claim 1, further comprising an aperture stop located between the third lens unit and the fourth lens unit and configured to move during zooming.

8. The zoom lens according to claim 1, further comprising an aperture stop located between the third lens unit and the fourth lens unit and configured to remain stationary during zooming.

9. An image pickup apparatus comprising:
a zoom lens; and
a photoelectrical conversion element located at an image plane of the zoom lens and configured to receive an image formed by the zoom lens,
wherein the zoom lens comprises, in order from an object side to an image side:
a first lens unit having a negative refractive power;
a second lens unit having a positive refractive power;
a third lens unit having a negative refractive power;
a fourth lens unit having a positive or negative refractive power; and
a fifth lens unit having a positive refractive power,
wherein the first lens unit is stationary during zooming,
wherein at least the second lens unit, the third lens unit, and the fifth lens unit move along an optical axis during zooming, and
wherein, when fw is a focal length of the entire zoom lens at a wide-angle end and m2z is an amount of movement of the second lens unit during zooming from the wide-angle end to a telephoto end, and
wherein a sign of the amount of movement m2z is positive when the second lens unit is positioned closer to the image plane at the telephoto end than at the wide-angle end and the sign of the amount of movement m2z is negative when the second lens unit is positioned close to the object side at the telephoto end than at the wide-angle end,
the following condition is satisfied:

$$0.2 < fw/m2z < 1.5.$$

* * * * *